United States Patent [19]

Swanson et al.

[11] Patent Number: 5,600,778

[45] Date of Patent: Feb. 4, 1997

[54] GRAPHICAL RESOURCE EDITOR FOR SOFTWARE CUSTOMIZATION

[75] Inventors: Sara J. Swanson, Mountain View; Robert F. Andrews, San Jose; Gary M. Mandelstam, Cupertino, all of Calif.

[73] Assignee: International Business Machines Corporation, Armonk, N.Y.

[21] Appl. No.: 525,895

[22] Filed: Sep. 8, 1995

Related U.S. Application Data

[63] Continuation of Ser. No. 942,204, Sep. 8, 1992, abandoned.

[51] Int. Cl.$^6$ ............................................. G06F 3/14
[52] U.S. Cl. ..................... 395/333; 395/340; 395/352; 395/356; 395/335
[58] Field of Search ................................. 395/155, 157, 395/160, 159, 161, 156; 345/119, 146, 902

[56] References Cited

U.S. PATENT DOCUMENTS

| | | | |
|---|---|---|---|
| 4,866,638 | 9/1989 | Cosentino et al. | 395/159 |
| 5,041,992 | 8/1991 | Cunningham et al. | 395/155 X |
| 5,202,828 | 4/1993 | Vertelney et al. | 395/159 X |
| 5,249,263 | 9/1993 | Yanker | 395/155 X |
| 5,297,250 | 3/1994 | Leroy et al. | 395/157 |
| 5,335,320 | 8/1994 | Iwata et al. | 395/155 |
| 5,347,627 | 9/1994 | Hoffmann et al. | 395/157 |
| 5,347,629 | 9/1994 | Barrett et al. | 395/161 |
| 5,371,844 | 12/1994 | Andrew et al. | 395/155 |
| 5,388,202 | 2/1995 | Squires et al. | 395/157 |
| 5,398,312 | 3/1995 | Hoffmann | 395/156 |
| 5,430,836 | 7/1995 | Wolf et al. | 395/155 |
| 5,522,024 | 5/1996 | Hiraga et al. | 395/155 |

OTHER PUBLICATIONS

Microsoft Windows User's Guide, Version 3.0, Microsoft Corporation, 1990, Chapter 5 Control Panel, pp. 147–158, 177–180.

*Primary Examiner*—Raymond J. Bayerl
*Attorney, Agent, or Firm*—Baker, Maxham, Jester & Meador

[57] ABSTRACT

A graphical resource editor for selectively modifying graphical resources in software applications provides a main window graphical user interface object for interaction with the graphical resource editor. The main window contains a resource category selection object including a list of selectable resource category objects. These objects contain resource category descriptors corresponding to categories of editable resources. The resource category selection object provides a user activatable interface for selecting among the list of resource category objects an editable resource category. The graphical resource editor further includes a system responsive to user activation of the resource category selection object for generating in the main window a list of resource descriptors corresponding to the selected category of editable resources. A plurality of resource value display fields are provided in the main window for displaying resource values representing the status of the selected category of editable resources. Also provided in the main window is a set of resource value selection objects providing user activatable interfaces for setting editable resource values. Customization of software applications may performed statically by saving resource edits to an application resource file, or dynamically by applying resource edits on-the-fly to an application running concurrently with the graphical resource editor.

21 Claims, 14 Drawing Sheets

GRAPHICAL RESOURCE EDITOR FOR SOFTWARE CUSTOMIZATION

This application is a file wrapper continuation, of application Ser. No. 07/942,204, filed Sep. 8, 1992, now abandoned.

BACKGROUND OF THE INVENTION

The present invention relates generally to the customization of graphically-controlled software in a data processing system. More particularly, the invention pertains to an editing system for selectively modifying resources used by software applications to provide graphical user interface objects.

A graphical user interface is a window-based system for interfacing with a programmed computer by means of graphical display windows. Such systems are ideally suited and conventionally adapted for menu-driven operation. That is, they allow a user to control computer operation by selecting from one or more menus exhibited in the graphical display windows without entering statements in alphanumeric form via a keyboard. A graphical display window is an area of the computer's physical display screen containing a collection of interface objects through which software applications running on the computer receive inputs and present their output. An interface object, such as a menu selection item, is a graphics- and/or text-based image that signifies information, function, and/or data entry. Such objects include push buttons, scroll bars, dials, sliders and many other graphical indicia. An interface object can be "selected" by moving a mouse-controlled pointer or cursor to it and operating (i.e., pressing or releasing) a button on the mouse. This selection process includes what is referred to in the art as "point-and-click". The interface object is supported by code that assists in providing appropriate response to the user's selection.

It is conventional for software applications to run in their own graphical display windows, the appearance and characteristics of which are defined by the application software. Each application employs one or more top level windows that define corresponding graphical display areas used by the application. In so-called "multitasking" operating systems, there may be several applications, each using one or more windows, sharing the screen together. To minimize confusion, these windows can be moved to different positions on the screen, and may also be resizable. Moreover, the windows are assigned a stacking order such that overlapping windows do not compromise window appearance. Higher order windows simply cover lower level windows in the area of overlap. Thus, the effect is that of sheets of paper arranged on a desktop.

One of the implications of a shared-screen, multitasking window environment is that the graphical display windows must provide a visually distinctive appearance that helps users control the sometimes complex functionality presented on the physical screen. Users may also have special requirements, apart from multitasking considerations, for ensuring particularized window characteristics. In the art of graphical user interfaces, the term "resources" refers to color, text fonts, screen cursors and other graphical attributes users may desire to control. Resource values are chosen by application developers during program development and may not represent an ideal choice when the application is implemented on a user's data processing system. Accordingly, it would be desirable to allow users to override or modify resource selections made by application programmers so that users are able to customize efficiently the look and feel of their applications.

In some operating environments, user customization of window resources is intended. The X Window System is an industry-standard software system developed at Massachusetts Institute of Technology that provides a window environment for developing device-independent graphical user interfaces. In the X Window System, resources defining attributes of graphical interface objects are set by program developers in an application-specific file known as an "app-defaults" file. The X Window System allows users to override resource settings in the app-defaults file with a user-generated file known as an ".Xdefaults" file. When an application is invoked, the X Window System, in an initializing step, creates an resource database and loads it with resource specifications found in the application's app-default file and the user's .Xdefaults file. The resource database is used by the application to build its windows and graphical interface objects at run time.

In the X Window System, as in other graphical user interface systems, graphical interface objects are defined hierarchically. For applications based on the X toolkit intrinsics, each graphical interface object is constructed from one or more components known as "widgets". A widget is an object oriented programming entity containing data and one or more functions which operate on that data. When created by an application, a widget is assigned its own screen window. There are various standard widget sets available to application developers for building graphical user interfaces. Open Software Foundation, Inc. provides the Motif toolkit. Widgets in the Motif toolkit include scroll bars, title bars, menus, dialogue boxes and a host of other graphical interface objects.

In app-defaults and .Xdefaults files, the resources used by widgets are specified using hierarchical string identifiers that uniquely determine the widgets (or widget classes) to which they apply. These identifiers can include such information as the name (or class) of an application containing the widgets. Moreover, because widgets in an application's graphical display window are defined hierarchically, the resource identifier can include a list of widgets (or widget classes) arranged in the widget hierarchy. The syntax of these identifiers must be observed or the resource may not be correctly applied to the intended widgets (or widget classes). As a result, manipulating an .Xdefaults file can be cumbersome and time consuming.

In response to this dilemma, efforts have been made to develop editors for the X Window System that allow users to customize their applications. One such product is "Editres" from Massachusetts Institute of Technology. Editres is an editing tool that allows users to view the full widget hierarchy of any application that speaks the Editres protocol. Editres assists the user in constructing resource specifications and allows the user to apply the resource to an application and view the results dynamically. If the user is satisfied with the resource modification, Editres appends the modified resource string to a selected app-defaults file or to the user's .Xdefaults file.

Despite its beneficial features, Editres suffers from several disadvantages. For example, some applications require source code modifications or recompilation in order to work with Editres. In the dynamic editing mode, Editres fails if it cannot communicate with the application. Editres also tends to overcomplicate the editing process by presenting the user with an entire widget tree containing every widget used by an application. Often, the user is not interested in more than a relatively small number of editable features. Moreover, it does not hide system window mechanisms from the user. Editres also does not provide editors directed to selected resource types. Resources are presented without regard to their relationship with resources of similar type, such as colors, fonts, etc. Nor are resources explained. Finally, Editres is language dependent because it requires the user to modify resources using an application's internal widget and resource strings. These are based on pseudo-English programming terms. This is undesirable for users who are not English speaking, or who are not familiar with resource string syntax, or who may not even understand the purpose and function of particular resources.

Another available resource editor is the Motif Resource Editor (MRE) from Open Software Foundation, Inc. MRE provides a system for editing resources using editing mechanisms that group resources by type. One editing mechanism modifies color resources. Another editing mechanism modifies font resources. Still other editing mechanisms modify filename and boolean resources, respectively. MRE allows editing selections to be appended to selected app-defaults files or to the user's .Xdefaults file. A disadvantage of MRE is that there is no provision for dynamic editing of concurrently executing applications. Moreover, no graphical interface is provided. Nor does MRE hide internal window mechanisms from the user. Finally, the MRE editor is language dependent and is not internationalized.

Accordingly, despite previous efforts to facilitate the efficient customization of software applications, the art still lacks a customization tool that overcomes the deficiencies outlined above. What is needed is a graphical resource editor providing a fully internationalized graphical interface to customization that frees the user from the conventions of resource specifications and the details of internal window mechanisms. The resource editor should operate with all applications, both old and new, without source code modifications or recompilation. It should allow static modification of selected resource files as well as dynamic modification of concurrently executing applications. The editor should group resources by type and provide dedicated interfaces for each resource type. Finally, because applications can have thousands of resources, a mechanism should be provided selecting a set of resources representing desirable or likely features for customization while maintaining an ability to add additional resources as desired.

SUMMARY OF THE INVENTION

The present invention is directed to a graphical resource editor that provides an opportunity for users to selectively modify resource values of interest in a highly efficient way. In a preferred aspect, a main interface window provides a graphical user interface object for interaction with the graphical resource editor. Within the main window is a resource category selection object including a list of selectable resource category objects. These objects contain resource category descriptors corresponding to categories of editable resources. The resource category selection object provides a user activatable interface for selecting among the list of resource category objects an editable resource category. The graphical resource editor further includes a system responsive to user activation of the resource category selection object for generating in the main window a list of resource descriptors corresponding to a selected category of editable resources. A plurality of resource value display fields are also provided in the main window for displaying resource values representing the status of the selected category of editable resources. There is further provided in the main window a set of resource value selection objects providing user activatable interfaces for setting editable resource values. Customization of a client application may be performed statically by saving resource edits to a resource file, or dynamically by applying resource edits on-the-fly to an application running concurrently with the graphical resource editor.

DETAILED DESCRIPTION OF THE PREFERRED EMBODIMENTS

SYSTEM CONTEXT

Figure 1:
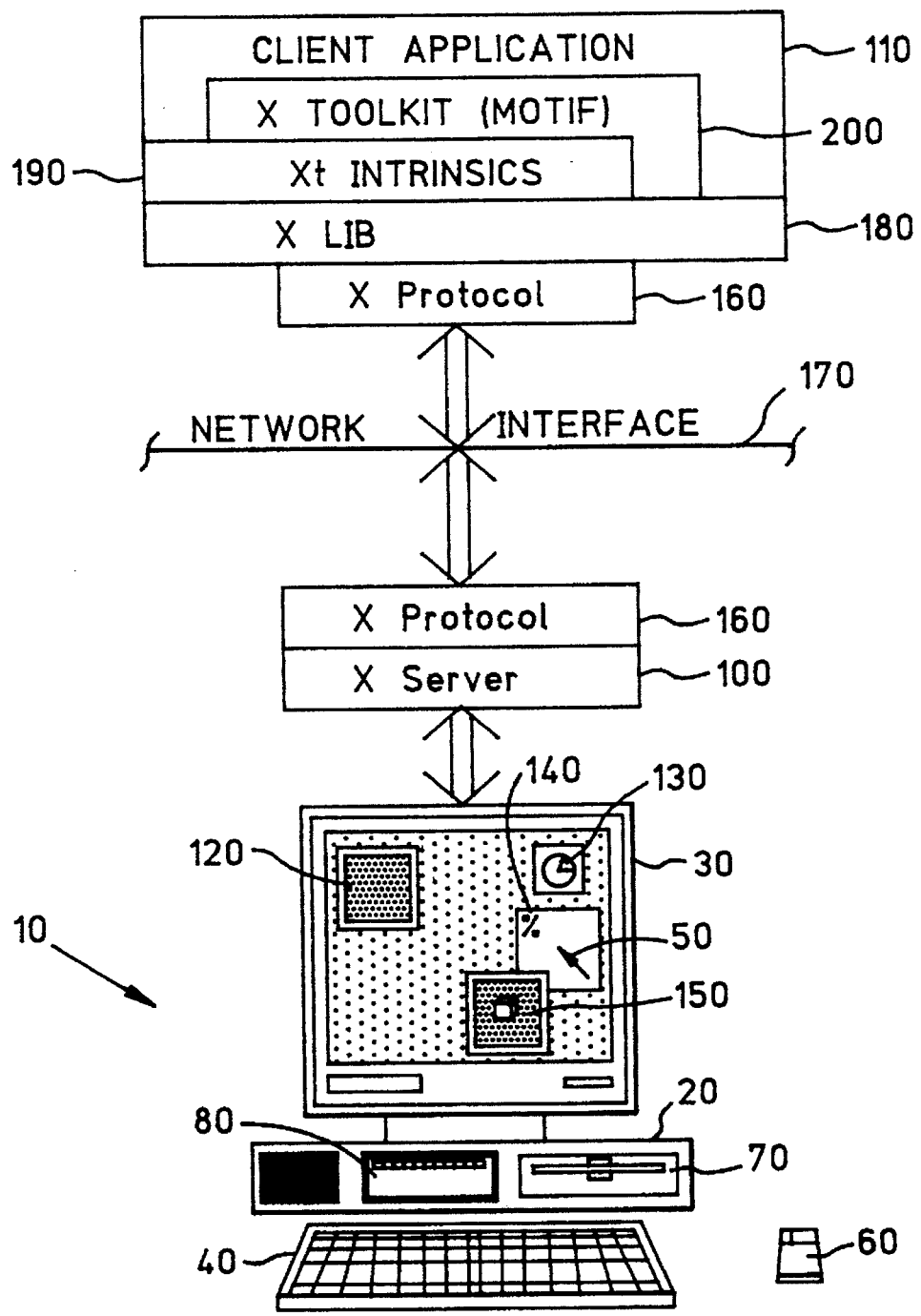
FIG. 1 is a diagrammatic illustration of a data processing system incorporating a graphical resource editor of the present invention.

It will be understood and appreciated by those skilled in the art that the inventive concepts set forth herein, pertaining to the provision of a graphical resource editor in a digital processing system, may be embodied in a variety of system contexts. One such system is illustrated by way of example in FIG. 1, wherein a data processing system designated generally as 10 includes a data processing unit 20, a video display terminal 30, a keyboard 40, and a cursor control system including a screen cursor 50 and a mouse 60 providing a user actuatable cursor positioner for providing control inputs to the data processing system 10. The data processing system 10 further includes data storage resources including a floppy disk drive 70, a hard disk drive 80 and local volatile memory (not shown) utilized by the data processing system to execute programs and control various hardware and software entities of the system.

The data processing system 10 may be selected from any of a number of conventional processor devices, including, but not limited to, processors commonly found in that class of data processing apparatus known as work stations. The preferred operating environment of the graphical resource editor of the present invention is the X Window System from MIT. As indicated above, the X Window System provide a device-independent, network-transparent, graphics windowing system including an application program interface for data processing systems. The X Window System is designed to be operating system independent, but is most commonly used with the UNIX and AIX operating systems. The X Window System is based on a client-server model wherein software applications requiring graphical output to a graphical display terminal utilize the services provided by a server having control of the graphical display terminal. The "X client" and "X server" represent software entities which may reside on discreet hardware platforms or may operate at a single work station or other data processing system.

In the data processing system of FIG. 1, the X server is designated by reference number 100 while the X client is designated by the reference number 110. The X server 100 manages inputs from the keyboard 40 and the mouse 60. It manages the video display 30 in order to process graphical output information from the X client or client application 110 and display it in a designated window such as the window 120 on the display. At the same time, the X server 100 may be managing other windows 130, 140 and 150 in the display. These windows can represent the outputs of other client applications or may represent interface windows for controlling the data processing system 10 itself.

The X server 100 assigns windows to applications desiring graphical output, and also provides window positioning and resizing services. Other window management tasks are performed by the client applications assigned to the windows. The server communicates user generated events to client applications and the client applications return information to the X server for performing necessary actions in their client windows. These communications between the X clients and the server follow a well-defined protocol known as the X protocol. The programming components implementing the X protocol are shown in FIG. 1 by reference number 160. Communication using the X protocol is directed through a network interface 170 which allows the client application 110 to be located at a remote platform, or within the data processing system 10, without affecting the client-server relationship. The X protocol is an asynchronous byte stream protocol providing an interprocess communication mechanism that defines the meaning of data exchanged between the client and server. The X server interprets the X protocol byte stream from clients and generates graphics output.

In order to facilitate the task of writing client applications, the X Window System provides a library of C language routines known as Xlib. The Xlib is shown in FIG. 1 by reference number 180. The Xlib provides access to the X protocol through several hundred or more utility routines for generating graphics primitives. These routines can be utilized directly by the client application 110 as shown in FIG. 1. In addition to the Xlib, the X Window System provides a higher level set of functions known as the X toolkit intrinsics. The Xt intrinsics provide a set of utility functions for building graphical user interface objects by calling Xlib functions to construct necessary graphical elements. The Xt intrinsics are illustrated by reference number 190 in FIG. 1. In addition to the Xt intrinsics the X Window System supports various "toolkits" which provide a library of graphical interface objects (known as "widgets" and "gadgets") which applications can use in constructing graphical user interfaces. The Motif toolkit from Open Software Foundation, Inc. provides a comprehensive set of widgets (and gadgets) constructed using Xt intrinsics and Xlib functions to provide graphical interface objects. As indicated above, widgets are object-oriented programming entities containing data and functions that operate on the data. Gadgets are similar to widgets but do not receive their own window when invoked. In the system of FIG. 1, the X toolkit (Motif) widget library is illustrated by reference number 200. A client application 110 can utilize widgets provided by the X toolkit 200 or can utilize the Xt intrinsics 190 or the Xlib 180 to construct its own widgets.

As discussed above, widgets form the building blocks used by applications to construct graphical user interfaces. Widgets are related to one another in a widget hierarchy beginning with a top level shell widget corresponding to the top-level window created by the X server for the application. All subsequent widgets of an application emanate from the shell widget. Each subsequent widget created by an application is assigned a corresponding window by the X server. Applications with graphical user interfaces generated under the X Window System are thus characterized by parallel hierarchies of windows and widgets.

In FIG. 1, the display 30 generates a plurality of graphical display windows 120, 130, 140 and 150. As indicated, each of these windows corresponds to a client application communicating with the X server 100. Each of these windows contains one or more widgets generated by the client applications. The widgets in turn, utilize application "resources" to specify window characteristics such as background and foreground color, the appearance of text fonts, the shape and configuration of screen cursors and other graphical attributes of the windows. In the X Window System an application resource can be any user-customizable parameter that affects an application's behavior or appearance. Application resources are stored in application-generated app-defaults files and the user's .Xdefaults file. These files are maintained in directories which may be accessed through the data processing system 10.

GRAPHICAL RESOURCE EDITOR OVERVIEW

Figure 2:
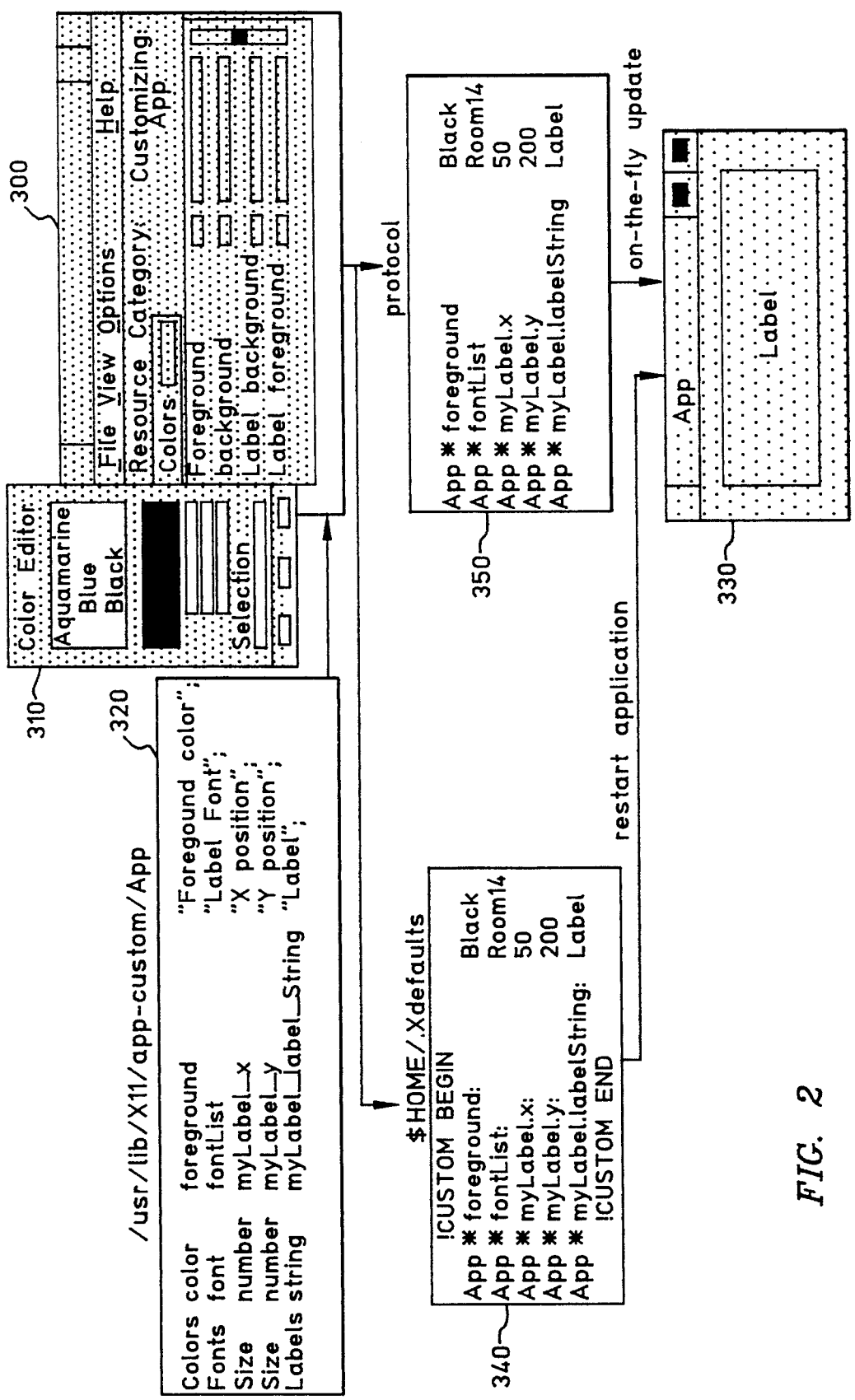
FIG. 2 is a diagrammatic illustration showing a portion of a graphical resource editor of the present invention.

In accordance with the present invention, the graphical resource editor is incorporated in the data processing system 10. The graphical resource editor provides users with the capability to access application resources and selectively modify the resources to change one or more attributes of an application's graphical user interface. This capability includes editing concurrently running applications "on-the-fly" so that the effects of resource changes can be viewed instantaneously. FIG. 2 illustrates some of the functional characteristics of the graphical user interface with respect to an application to be modified. The graphical resource editor generates a custom interface window 300 on the data processing system display 30, the features of which are shown generally by reference number 300. The custom interface window 300 includes a menu for selecting editable resources and for specifying resource values. For some resource value types, such as colors, the graphical resource editor provides browsing editors, such as the color editor 310, for controlling a wide range of resource values. The browsing editors are implemented as pop up windows that are selectable from the main customization window 300. Where no longer required, these windows are deleted from the screen.

It is not uncommon for applications running in the X Window System to employ hundreds of widgets whose the attributes are defined by an even greater number of resources. Because it is both undesirable and unnecessary to edit all such resources, the graphical resource editor of the present invention utilizes a resource filter mechanism to specify only resources that are desirable to edit. This filtering mechanism is implemented through a custom data file which will be referred to as an "app-custom" file. An app-custom file is illustrated in FIG. 2 by reference number 320. It is intended that app-custom files will be generated for each application to be used with the graphical resource editor. In addition, a user can create a default app-custom file to be used when an application specific app-custom file is not available. The information contained in the app-custom file is used by the graphical resource editor to build the custom interface window 300 based on customization information contained therein.

In FIG. 2, the graphical resource editor is used to modify the resources of "client" application having a graphical user interface 330. The resources utilized by this application can be modified in two ways. First, resource edits can be stored in the user's .Xdefaults file 340. In addition, if the client application is running concurrently with the graphical resource editor, resource edits can be provided to the application "on-the-fly" using a communications protocol 350, described in more detail below. Using the protocol, the client application can be updated without being restarted. For permanent storage of resource edits, however, the changes must be saved to the user's .Xdefaults file.

Figure 3A:
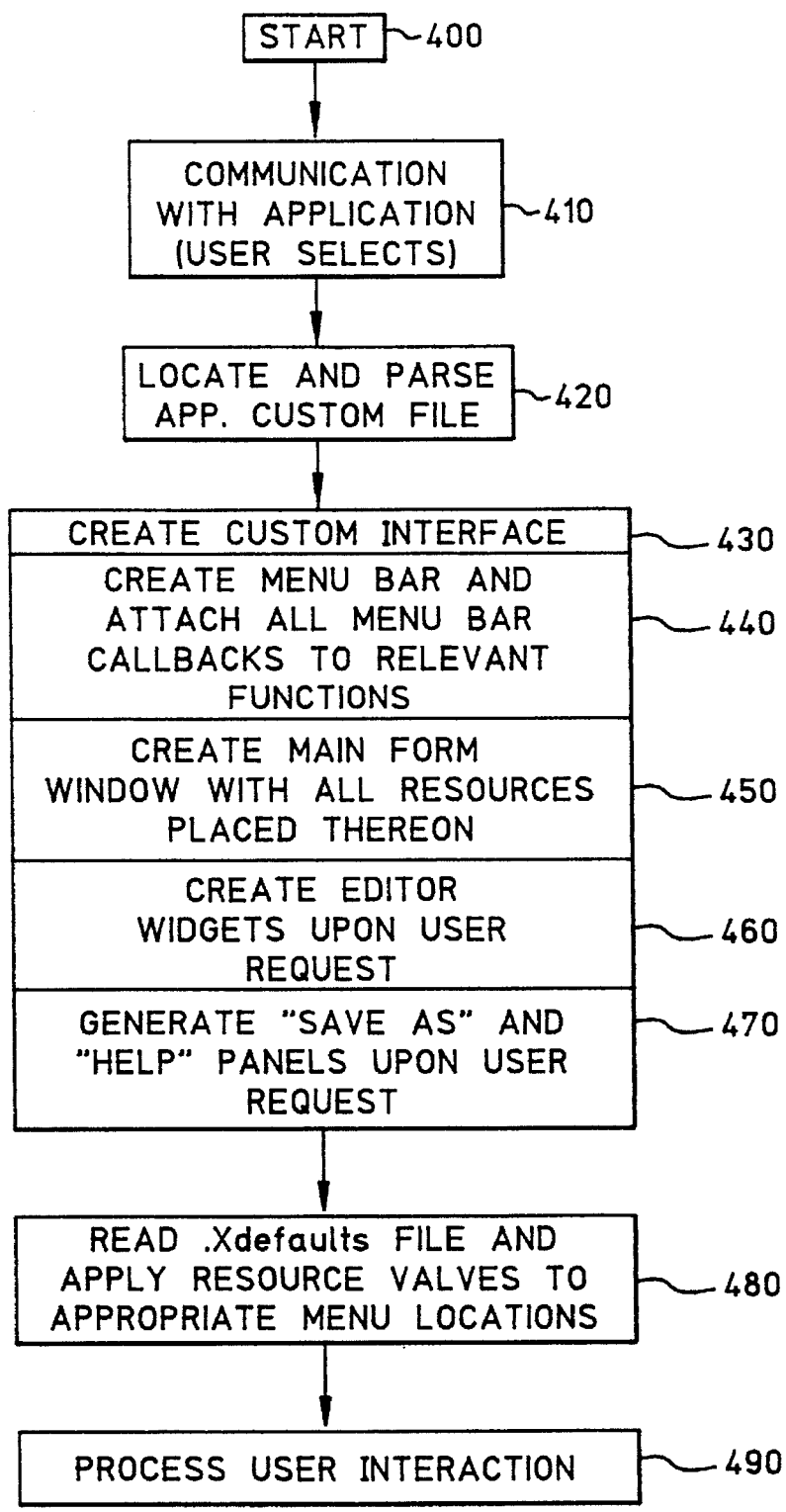
FIG. 3A and 3B collectively provide a flow diagram showing process flow in a graphical resource editor of the present invention.
Figure 3B:
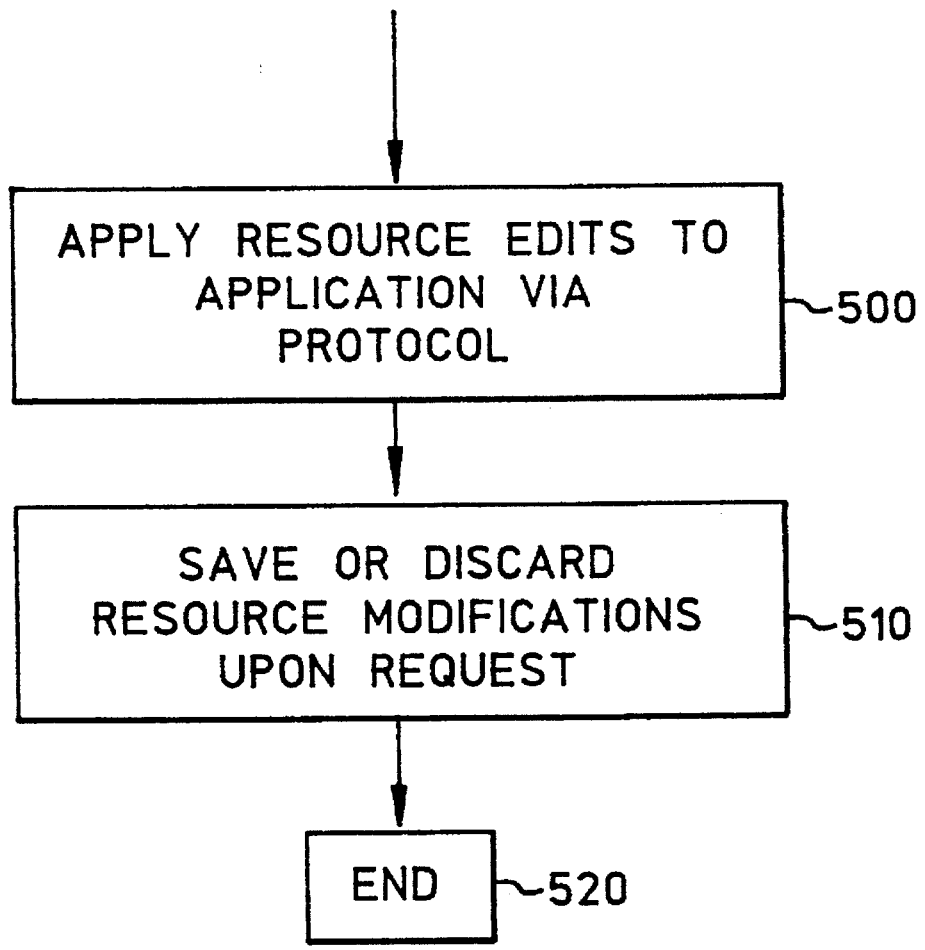

FIGS. 3A and 3B illustrate process steps taken by the graphical resource editor of FIG. 2 during a resource editing session. The editing process starts in step 400 when the user commences execution of the resource editor. In step 410, the user selects an application to customize and the resource editor attempts to establish communication with the application for the purpose of instantaneously updating it and then locates the app-custom file for that application. In process step 420, the resource editor locates and parses the app-custom file so that the resource information contained therein can be applied to the resource editor's custom interface window 300. The next step 430 in the graphical resource editing process is to create the custom interface window 300. This step includes a first step 440 of creating a window menu bar and a step 450 of creating resource selection objects. These interface objects are conventionally formed using combinations of widgets available in a widget library such as the Motif toolkit. They are generated using resource information from the app-custom file. In step 460, the resource editor builds editor widgets as necessary upon a user request for editor services. In step 470, the resource editor generates "save as" and "help" panels upon user selection from the menu bar.

With the custom interface window 300 established, the resource editor reads the user's .Xdefaults file (or specified app-defaults file) in step 480 and applies resource values to appropriate resource selection objects in the custom interface window. The resource editor is now ready for user interaction. This user interaction is processed by the graphical resource editor in step 490. Usually, this results in one or more editor widgets being generated by user requests for editor services. In cases where the application to be customized is running concurrently with the resource editor, the user may request that the application be updated on-the-fly. In step 500, the resource editor responds to such a request by applying resource edits as they are made via a communication protocal between the resource editor and the application to be customized. Following completion of an editing session, the user is prompted to save resource modifications to the user's .Xdefaults file (or a specified app-defaults file). The user may also discard the resource edits. The resource editor responds to the user's selection in step 510 and the editing session is terminated in step 520.

Figure 4:
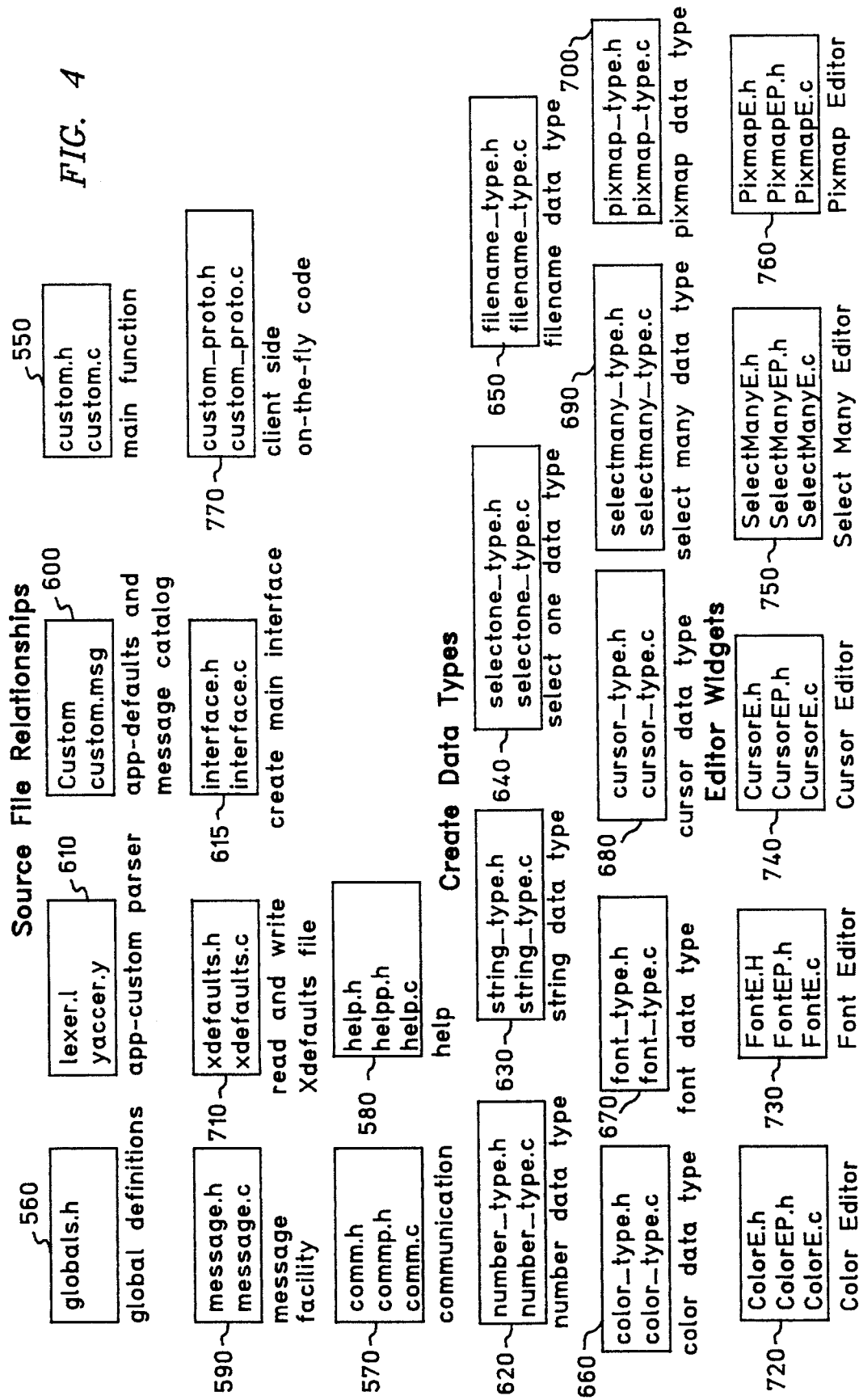
FIG. 4 is a block diagram showing source files, data types and widgets used by a graphical resource editor of the present invention.
Figure 5:
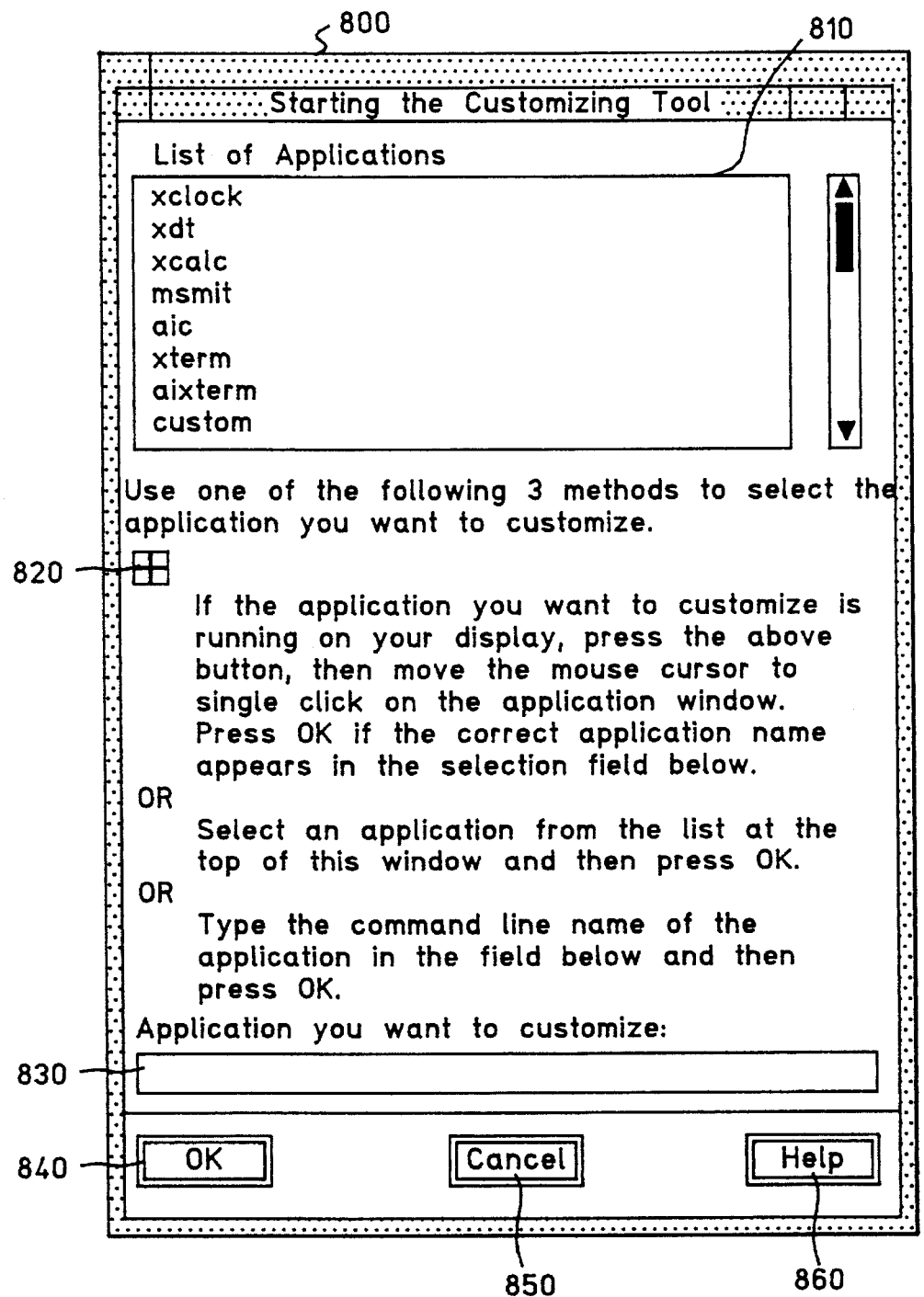
FIG. 5 is an illustration of a graphical resource editor start-up menu.

Turning now to FIG. 4, the source and header files, data types and editor widgets used by the resource editor in a preferred embodiment are shown diagrammatically. A preferred version of the graphical resource editor has been constructed using the C programming language, although other languages might also be used. In accordance with conventional C language programming techniques, the graphical resource editor uses main source and header files 550 that control the process flow described above in relation to FIGS. 3A and 3B. In addition to the main source and header files 550, the graphical resource editor uses a standard header file 560 containing global definitions used by other source files. Communications source and header files 570 are used for on-the-fly communication to identify the window id of the top level window of an application to be customized. Help source and header files 580 are provided to support the resource editor help facility. Message source and header files 590 provide a resource editor message facility supporting pop up windows containing messages regarding operation of the resource editor. Messages to be displayed by the message facility are placed in a message catalog file portion of a custom file 600. The default colors, fonts, etc. for the resource editor are stored in an app-defaults file portion of the custom file 600. The app-custom parser 610 contains files built using the UNIX/AIX parser-building tools "Lex" and "Yacc". The parser is used for locating and parsing app-custom files corresponding to applications to be customized. As described in more detail below, this parsing process uses information in the app-custom file to generate global structures referred to as the custom list and the custom group. Main interface source and header files 610 are used to create the custom interface window 300. The main interface source file uses the data type files 620–700 to generate to appropriate graphical interface objects corresponding to the different resource types identified in the app-custom files. The data type source files contain the functions and callbacks for each resource data type.

The .Xdefaults source and header files 710 are used to read and save to the user's .Xdefaults file (or other specified resource file) and apply resource values therein to appropriate menu locations in the custom interface window 300. The editor widget files 720–760 are used to generate, respectively, a color editor, a font editor, a cursor editor, a select many editor and a pixmap editor in response to user interaction with the custom interface window 300. Finally, the "on-the-fly" source and header files 770 provide an event handler that allows concurrently executing client applications to communicate with the graphical resource editor. These files are linked to the client application during client application linking.

GRAPHICAL RESOURCE EDITOR DETAILED FUNCTIONAL DESCRIPTION

A preferred graphical resource editor will now be described in the context of its detailed functional and operational characteristics which, as outlined above, are preferably implemented in an X Window graphical user interface environment. Persons skilled in the art of programming in the X Window System will appreciate from the ensuing description of editor functions that the invention can be implemented in a variety of ways using conventional X Window commands and functions, all of which are extensively documented.

Start-up of the graphical resource editor is achieved by typing the command "custom" together with one or more command line descriptors in accordance with the following UNIX/AIX command format:

custom {-h}{-e Editor/{-s filename}{Application}}

Command line help may be obtained using the -h option. The -e option allows individual browser editors to be invoked on a stand-alone basis. As described in more detail below, the resource editor provides a color browser, a fonts browser, a cursors browser, a select many browser and a pixmap browser. The -s option provides way to specify a resource file from which to read in and save resources and values. The default is the user's .Xdefaults file. The Application option allows user to identify an application to be customized. The user may also specify standard AIX/UNIX windows command-line options such as -fg for setting foreground color, -bg for setting background color, and other commands. These commands are processed by conventional X Window functions.

Following entry of the "custom" command, the graphical resource editor generates a start-up window 800 in the display 30 of the data processing system 10. Like all of the windows, fields, panels and other graphical objects generated by the graphical resource editor, the appearance and function of the start-up window 800 is determined by combinations of widgets (and gadgets) built from an X Window widget library such as the Motif library, together with application-defined callback functions that respond to user input events occurring in the widget windows. The start-up window 800 includes a scrollable application list window 810 containing a list of applications available for customization. A resource file containing the name and class of each listed application, and the name and class of their corresponding app-custom files, is used by the graphical resource editor to generate the information in the window 810. Below the application list window are three text fields representing three options by which applications can be selected by the user. The first option utilizes a push button interface object 820. This option is used when an application to be customized is running concurrently on the data processing system 10. The user activates the push button 820, moves the mouse cursor to a window used by the application of interest and activates the mouse in that window. A window searching procedure is used to identify the application to be customized and to display its name in the display field 830 of the start-up window 800. If the application name is the one desired, the user can select the application using the "OK" push button 840. The window searching procedure is built using the Xt convenience function XtAppNextEvent(). This function traps events reported by the X server and places them in a data structure known as the Xevent union. The X server event reports include information about mouse events. By querying the Xevent union, the custom application obtains an identification of the window in which the mouse pointer is positioned during mouse activation. From this information, the name and class of the client application can be readily determined. The second option for selecting an application is to choose from the list of applications in the application list window 810. When an application is selected its name appears in the display field 830 and can be accepted by selecting the "OK" push button 840. The third option for selecting an application is to simply type in the application name in the display field 830 and select the "OK" push button 840. Following the selection of an application to be customized, the graphical resource editor commences a communications protocol, described in more detail below, in order to establish communication with the application for the purpose of instantaneously updating it in "on-the-fly".

The application selection procedure occurs in process step 410 of FIG. 3A. In process step 420, the resource editor searches along predetermined search paths for the application's app-custom file. The app-custom file must have been previously generated by the application programmer or by the user prior to editing the application. If no app-custom file exists for the application, a default app-custom file is used. This can be provided with the resource editor package or generated by the user. If the default app-custom file cannot be found or if there is an error in a selected app-custom file, an error message will be displayed in a pop up window. The start-up window 800 also includes a "Cancel" push button 850 and a "Help" push button 860. The "Cancel" push button allows the user to cancel an application selection and begin again. The "Help" push button 860 is used to generate a pop up window containing help information for using the start-up window 800.

Figures 6, 7:
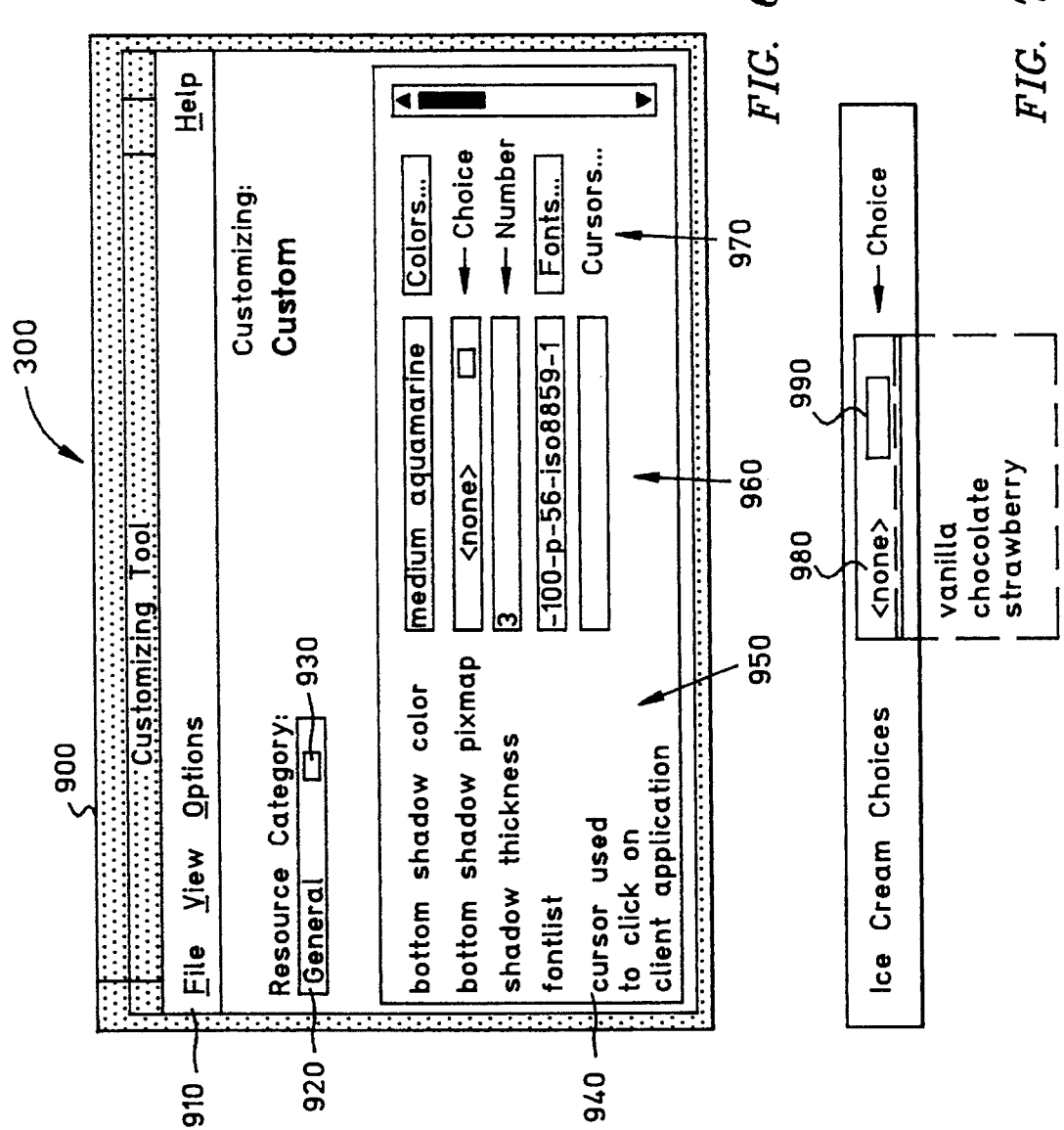
FIG. 6 is an illustration of a graphical resource editor customizing menu.
FIG. 7 is an illustration of a sub-part of the menu of FIG. 6.

Once a customizable application is selected and its app-custom file, or the default app-custom file, is found, the app-custom file is parsed as described above in regard to process step 420 of FIG. 3A. The parsing process extracts information from the app-custom file that is used to generate the resource editor's custom interface window 300. As shown in FIG. 6, this interface window is formed by a main window 900 providing a graphical user interface object for interaction with the graphical resource editor. Within the main window 900 is a menu bar window 910 containing a series of pull down menus designated "File", "View", "Options" and "Help". Below the menu bar window is a main form window that contains an arrangement of selection objects providing a menu of editable resources. One such menu item is represented by a resource category selection object 920 that includes a selection push button 930. The resource category selection object 920 contains a resource category descriptor label identifying a category of editable resources displayed concurrently in a scrollable window panel 940. The resource category selection object is supported by a callback function which generates, in response to a user pressing and holding a mouse button while the mouse pointer is on the selection push button 930, a cascading list of resource category descriptors beginning with the resource category descriptor originally contained in the resource category selection object. The resource category descriptors correspond to categories of editable resources. The resource category selection object allows the user to select an editable resource category by dragging the mouse pointer over the list and releasing the mouse button when the pointer is positioned on a resource category of choice. A callback function associated with the selection object 920 responds to this operation by causing the scrollable window 940 to display another set of resources to customize. The resource category selection object 920 thus provides a user activatable interface for selecting among a list of resource category objects an editable resource category.

Inside the scrollable window 940 is a list of resource descriptors 950 corresponding to a selected category of editable resources. The scrollable window 940 further includes a plurality of resource value display fields 960 representing the status of the selected category of editable resources. In addition, the scrollable window panel 940 includes a set of resource value selection objects 970 providing user activatable interfaces for setting editable resource values.

The information displayed in the custom interface window 300 is determined from the client application's app-custom file. The app-custom file is a character string file containing character strings arranged in the following format:

| Group | Type | Resource | Name | [Values] |
|-------|------|----------|------|----------|

The "Group" identifier is used to organize similar resources. For example, "scroll bar color", "on/off scroll bar", and "number of scrolled lines to save" are all different resource types but they are related. The "Group" parameter can be any character string in any language. These character strings constitute the resource category descriptors that will be placed as labels in the resource category descriptor object 920. The resource category descriptor "General" in the resource category descriptor object in FIG. 6 identifies a group of resources corresponding to the general attributes of an application. Resources may be grouped in any manner desired by the user.

The "Type" parameter specifies whether the possible values of a resource should be limited to colors, fonts, or other value types. This parameter is used to generate an appropriate resource value selector object 970 for specified resources contained in the resource descriptor list. The resource editor provides graphical tools that assist in setting a valid value to the corresponding resource value type. For example, colors are set using a color browser editor while fonts are set using a fonts browser editor. Other resource value types such as choices and numbers, are set in different ways, as described in detail below.

The "Resource" parameter is the actual resource string of the resource file to be modified by the editing process. This parameter obeys the X Window resource specification syntax such that resources are listed exactly as they would be in the .Xdefaults file, except that they are not prefaced by an application name or class. This information is not required because the resource editor attaches the appropriate application class to the beginning of each resource string prior to writing the string to the .Xdefaults file (or a selected app-defaults file) following an editing session.

The "Name" parameter is a descriptive explanation of each resource to be customized. This parameter defines the resource descriptors generated in the list 950 of resource descriptors in the scrollable window 940. Whereas the X Window resource string must be in English and follow the X Window resource specification format, the resource descriptor provided by the "Name" parameter can be in any language, thus making the graphical resource editor completely language independent.

The "Values" parameter is provided because some data types require additional data from which to create the custom interface window 300.

It will observed from FIG. 6 that the list of resource descriptors 950, the resource value display fields 960 and the resource value selection object 970 are positioned in successive horizontal groups in the scrollable window 940. Each horizontal group corresponds to a single editable resource that includes a resource descriptor, a resource value display field and a resource value selection object. Each horizontal group corresponds to a single line in the app-custom file. For example, the first horizontal group in the scrollable window panel 940 in FIG. 6 would correspond to the following app-custom file line:

"General" Color*bottomShadowColor "bottom shadow color"

Following are additional examples of app-custom file syntax:

The color, font, cursor, filename, number, and string data types all use the following syntax:

| Group | Type | Resource | Name ; |
|-------|------|----------|--------|

Following is an example of a color resource app-custom file syntax:

| "Menu Bar" | Color *menubar*background | "menu bar background" ; |
|------------|---------------------------|-------------------------|

A picture data type can be specified in the app-custom file using the following syntax:

| Group | Picture | Resource | Name | PictureType ; |
|-------|---------|----------|------|---------------| where the items can be any strings. Following is an example of this app-custom file syntax:

| Icon | Picture | *appIcon | "application icon" | bitmap; |
|------|---------|----------|--------------------|---------|

The PictureType value can be one of three types: bitmap, pixmap, or all. If bitmap is set, only bitmaps can be browsed; pixmap is similar. However, if all is set, both bitmaps and pixmaps are browsed. Bitmaps are black and white images where filenames end with .xbm; pixmaps are multicolored images where file extensions are .px.

The selectmany data type allows many values to be selected from a list of choices. It is limited to 20 items. A selectmany data type can be specified in the app-custom file using the following syntax:

| Group | SelectMany "Separator" | Resource Item1 [= String] | Name Item2 [= String] . . . ; |
|-------|------------------------|---------------------------|-------------------------------| where the items can be any strings. The separator parameter specifies one or more characters that are used to separate each of the items the user selected when the resource definition is written to the .Xdefaults file.

Following is an example of this app-custom file syntax:

| Foods | SelectMany *iceCream "Ice Cream Choices" " " vanilla chocolate strawberry ; |
|-------|------------------------------------------------------------------------------|

If users wish to see mope descriptive names for the choices, they can attach a string to each value with an = (equal sign). This is especially useful to translate values into other languages.

The following is an example:

```
Foods    SelectMany   *iceCream              "Ice Cream Choices"
         ", "
         vanilla = "Vanilla Flavor"
         chocolate = Fudge
         strawberry ;
```

The selectone type is a generic data type for choosing one value from among a list of choices. It is limited to 20 items. A selectone data type can be specified in the app-custom file using the following syntax:

```
Group    SelectOne  Resource  Name
         Item1 [= String]    Item2 [= String] . . . ;
``` where the items can be any strings. Following is an example of this app-custom file syntax:

```
Foods    SelectOne    IceCream              "Ice Cream Choices"
                                             vanilla chocolate strawberry ;
```

The selectone data type is represented by an option menu button to switch between the values. The first option is always <none>. This is consistent with the other data types because no values are written to the .Xdefaults file unless the user has specifically chosen one. If a user wants to see more descriptive names for the choices, the user can attach a string to each value with an =(equal sign). This is especially useful to translate values to other languages.

The following is an example:

```
Foods    SelectOne   *iceCream               "Ice Cream Choices"
         vanilla = "Vanilla Flavor"
         chocolate = Fudge
         strawberry ;
```

Comments must begin with an ! (exclamation point) as the first character on the line.

A brief example of an app-custom file follows:

```
! XClock app-custom file
Size        Number        *width           "width of clock";
Size        Number        *height          "height of clock";
Color       Color         *foreground      "foreground";
Color       Color         *hands           "analog hands";
Color       Color         *highlight       "highlight analog hands";
Color       SelectOne     *reverseVideo    "reverse video"
            true false;
Font        Font          *font            "digital clock font";
Behavior    Number        *update          "interval of updates/n (sec)";
Behavior    SelectOne     *analog          "type of clock"
            true = analog false = digital;
Behavior    SelectOne     *chime           "chime every half hour"
            true false;
Behavior    Number        *padding         "internal padding (pixels)";
```

The app-custom file parsing step described above in relation to process step 420 of FIG. 3A places the character strings of the app-custom file in a linked list of data structures which will be referred to as a "custom list". Each item in the list is a data structure corresponding to a single customizable resource. Each data structure contains a resources group, type, resource, name and value information from the app-custom file. Each data structure in the custom list also identifies widgets used to form the resource descriptor and resource value display fields in the scrollable window 940. Each data structure also identifies a widget that provides a default value for the "selectone" resource value type category. The widget for selectone is shown in FIG. 7 by the interface object 980 with its selection push button 990.

The graphical resource editor also parses the elements of the app-custom file into a linked list of data structures which will be referred to as a "custom group". The custom group holds all of the resource categories that are created and the widget IDs of the forms that graphically represent these groups inside the scrollable window 940. Each custom group data structure contains a resource category descriptor, a widget identifier corresponding to the resource category descriptor object 920, and a list of pointers identifying each resource type in the resource group. Each group represents resources that are part of a common resource category identified by a resource category descriptor. In addition to the custom list and the custom group, the graphical resource editor maintains a list of valid data types and the functions that are used to generate their corresponding interface objects. This list is referred to as the "custom type" list. The custom type list is formed from a plurality of data structures each containing a resource type identifier and a pointer to a function that creates an appropriate resource value selection object for that resource type. As indicated, these interface objects are represented by reference number 970 in FIG. 6. The resource types which may be used by the resource editor include color, font, number, string, selectone, selectmany, file, cursor and pixmap. Other resource types could no doubt also be categorized. A different set of widgets (and gadgets) is created for each data type. The creation functions and callbacks for each data type are contained in the data type files 620–700 as shown in FIG. 4.

The final step in the generation of the custom interface window 300 is shown as step 480 of FIG. 3A and involves reading the user's .Xdefaults file (or a selected app-defaults file) and applying the resource values to appropriate menu locations. A procedure for reading the selected resource file searches that file for a section identified as the CUSTOM section. The CUSTOM section is created by the resource editor the first time the editor is operated by the user and resource edits are saved. The resource editor creates the CUSTOM section at the end of a selected resource file. This section is delimited by the statements "! CUSTOM BEGIN" and "! CUSTOM END". In reading a selected resource file, the resource editor extracts from the CUSTOM section all resource values relating to the client application to be customized, and which correspond to resources specified in the custom list. These values are loaded into the custom list in association with the appropriate resources. If the selected resource file does not contain a CUSTOM section, the custom list is not modified and the resource value display fields in the custom interface window 300 are left blank until resources are edited by a user. An example of an .Xdefaults file with its CUSTOM section is shown below:

```
!.Xdefaults file
*background:         SkyBlue
*foreground:         Red
!CUSTOM BEGIN
xclock.width         200
xclock*foreground:   medium goldenrod
xclock*background:   forest green
!CUSTOM END
```

As resources are edited by a user, the corresponding data structures in the custom list are updated. To save the resource edits, the resource editor loops through the custom list and writes all resources values that are not NULL to the corresponding resource strings in the CUSTOM section of the selected resource file. During this updating procedure, a copy of the unedited resource file is preserved so that the original resource values can be retrieved, if necessary.

There are a variety of mechanisms for specifying resource values in the custom interface window 300. One such mechanism is provided by the resource value fields in the list 960. With the exception of the second field labelled "<none>", resource values may be typed into each field as a data entry field. To utilize this mechanism, the user activates a mouse in the appropriate resource value display field so that the keyboard focus is directed there. The desired resource value can be entered. Other mechanisms for selecting resource values are provided by the members of the resource value selection object list 970. This list of interface objects includes push buttons labelled "Colors . . . ", "Fonts . . . ", and "Cursors . . . ". Selection of these push buttons using a mouse results in the generation of browsing editors for editing the corresponding resource types. These push buttons are highlighted when the browser is called and unhighlighted when the browser is exited. Other interface objects in the list 970 do not include a push button. The interface object labelled "<-Number" requires that an appropriate numerical value be entered into the adjacent resource value display field in the list 960. The interface object labelled "<-choice" indicates that the adjacent selection push button 990, as shown in FIG. 7, should be selected to generate a cascading list on "selectone" objects.

Figure 8:
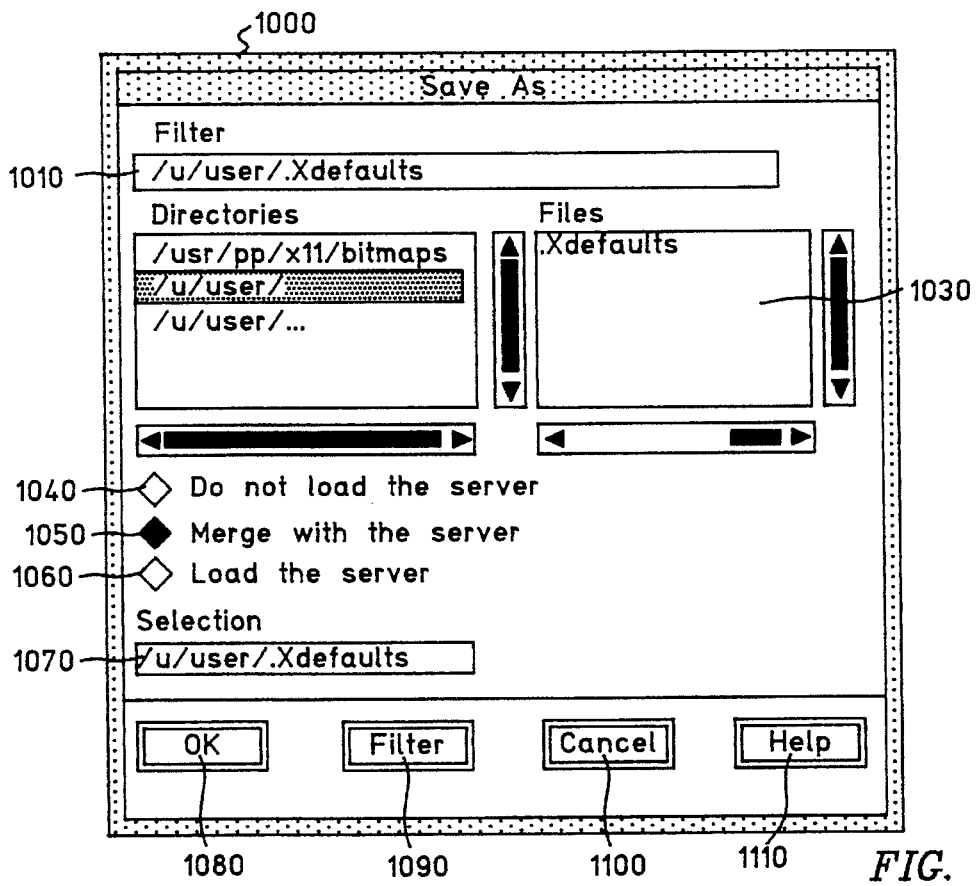
FIG. 8 is an illustration of a graphical resource editor filing menu.

Before discussing the browser editors, it is appropriate to consider the functions of the menu bar 910. As shown in FIG. 6, the first item in the menu bar 810 is the "File" option. Selection of this menu item generates a pull-down menu providing four command options. A first command identified as "New" starts the customizing session for a new application. When selected, the start-up window 800 is regenerated. If the user desires to edit a new application, the "OK" push button 840 is selected. If the user does not wish to customize another application, the "Cancel" button 850 is selected. The second command option in the "File" pull-down menu is the "Save As" command. This allows the user to save resource changes to the .Xdefaults file in the user's home directory, or any other resource file specified using the command line options available when the graphical editor is invoked. When the "Save As . . ." command option is selected, a pop-up dialogue window 1000 is generated, as shown in FIG. 8. The dialogue window 1000 contains a "Filter" field 1010 that specifies a search string for locating resource files of interest. The "Save As . . ." pop-up window 1000 also includes a scrollable "Directories" window 1020 and a scrollable "Files" window 1030. The "Directories" window allows a user to select file directories as filters to limit the number of selectable files. The "Files" window allows a user to select a specific resource file in which to save edited resource values. Below the scrollable windows 1020 and 1030 are three radio buttons 1040, 1050 and 1060. These radio buttons control whether the modified resource file is stored on the user's X server. By placing resource files on the X server, the user does not have to maintain an .Xdefaults file on every machine operating through the X server. The radio button 1040 specifies that the modified resource file will not be loaded on the server. The radio button 1050 specifies that the modified resource file will be merged with an existing resource file on the server. The radio button 1060 specifies that the modified resource file will be loaded as new resource file on the X server. The "Save As . . ." pop-up window further includes a "Selection" window 1070 identifying the resource file selected by the user. There is also provided an "OK" push button 1080, a "Filter" push button 1090, a "Cancel" push button 1100 and a "Help" push button 1110. The "OK" push button 1080 allows the user to accept the selected resource file. The "Filter" push button 1090 allows the user to activate the file filter. The "Cancel" push button 1100 cancels previous resource file selections and the "Help" push button 1110 calls a pop-up window containing help information for using the "Save As . . ." pop-up window 1000.

The third command option in the "File" menu is the "Reset Values" command. This command erases all resource values chosen by the user during an editing session and reverts the resource values to those that were read in from the resource file selected at the beginning of the customizing session. When the "Reset Values" command is selected, a pop-up window is generated that allows the user to cancel the selection of "Reset Values" or to accept that selection. The fourth and final command option of the "File" menu is the "Exit" command. Activation of this command allows a user to exit the resource editor. If resource modifications were made and not saved, the user is prompted and allowed to cancel the exit command or continue the exit procedure.

The second item on the menu bar 910 is the "View" option. Selection of this menu item generates a pull-down menu containing two command options. The first option is the "Resources" option. If selected, the "Resources" option causes the resource descriptors in the resource descriptor list 950 to change to actual X Window resource specifications. To return to the language independent resource descriptors, the "Resources" command can be selected again to toggle back to the default state. The second command option in the "View" menu is the "Instant Changes" option. Selection of this option causes the "on-the-fly" customization of the application selected for customization to be toggled on or off, provided the application is running concurrently with the resource editor. With this option selection, resources are updated instantaneously when a new value is chosen and this updating can be seen in the application window. If resource values are typed directly into the resource value display fields in the list 960, the user must additionally press the "Enter" key on the system keyboard to update the client application. The "Instant Changes" label in the "View" menu is grayed out when the resource editor is started until it can establish communication with the client application. If the resource editor is able communicate with that application, the user can activate the "Instant Changes" label as a toggle button to turn the on-the-fly feature on or off. If all instances of the client application are exited at any time after starting, the option is also grayed out. The "Instant Changes" option is intended as a tool to view possible changes. Since it is possible to corrupt the interface of an application (for example, setting an unreadable font), it is advisable to use this option only when the client application is in a non-critical state.

The third item in the menu bar 910 is the "Options" menu item. The activation of this item generates a pull-down menu containing a single command option labelled "Reacquire Instant Changes". This option allows the user to regain communication with a client application for the purpose of updating it instantaneously. This option can be used when the client application was not already running when the resource editor was started, or if the client application was restatted during a resource editing session.

Figure 9:
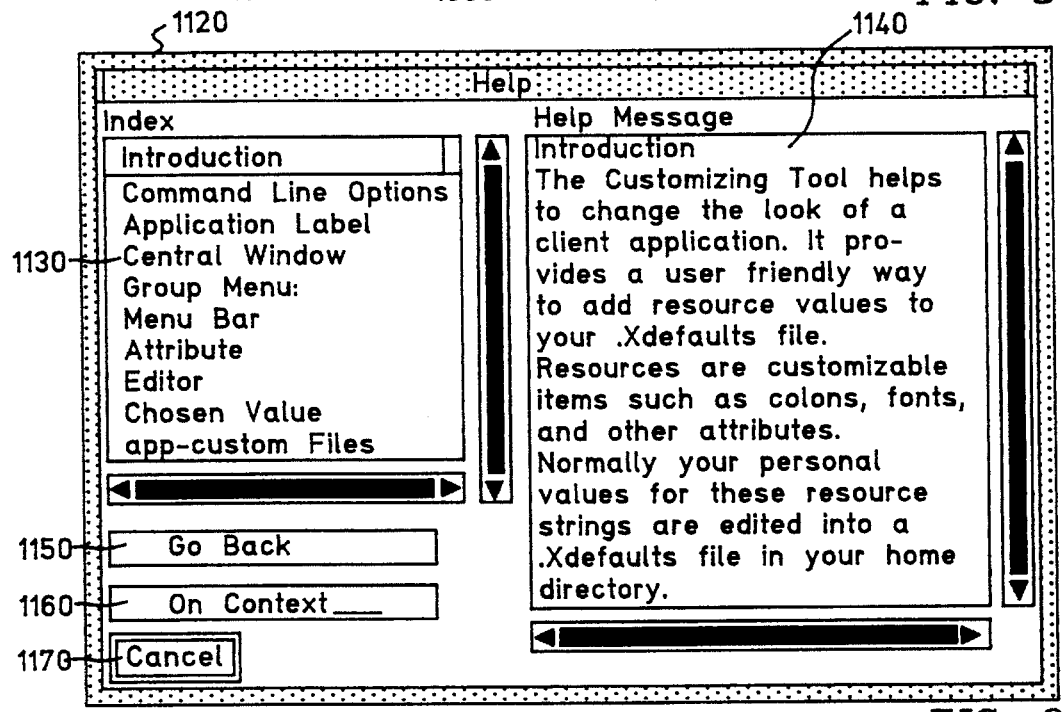
FIG. 9 is an illustration of a graphical resource editor help menu.

The final selection on the menu bar 910 is the "Help" menu item. Activation of this menu item generates a pull-down menu containing command options for generating help information for using the resource editor. The first help command option is the "Help Facility . . ." option. Selection of this option generates a pop-up help display window 1120 as shown in FIG. 9. The help display window 1120 includes a scrollable index window 1130 containing an index of resource editor topics. A scrollable "Help" message window 1140 contains help information corresponding to each topic in the help index. Below the scrollable "Index" window 1130 is a "Go Back" push button. This button is used because the help index is hierarchical. Selecting an item in the index causes a corresponding help message to be displayed in the help message window 1140. If the index item has additional help messages, selecting that item causes the index to descend to the next level. To return to the proceeding level, the "Go Back" button is activated. A second push button 1160 is labelled "On Context . . . ". This button provides access to context/sensitive help. A "Cancel" push button 1170 terminates the pop-up help window 1120. The second menu option on the "Help" menu is the "On Context . . ." option. Selection of this option changes the mouse cursor to a question mark cursor, prompting the user to click the cursor on any object of interest in the custom interface window 300. This causes the pop-up help window 1120 to be generated and the index and help messages for that object are displayed in the appropriate windows 1130 and 1140. The third command option under the "Help" menu item is the "On Help . . ." option. Selection of this option generates information concerning use of the help facility.

Figure 10:
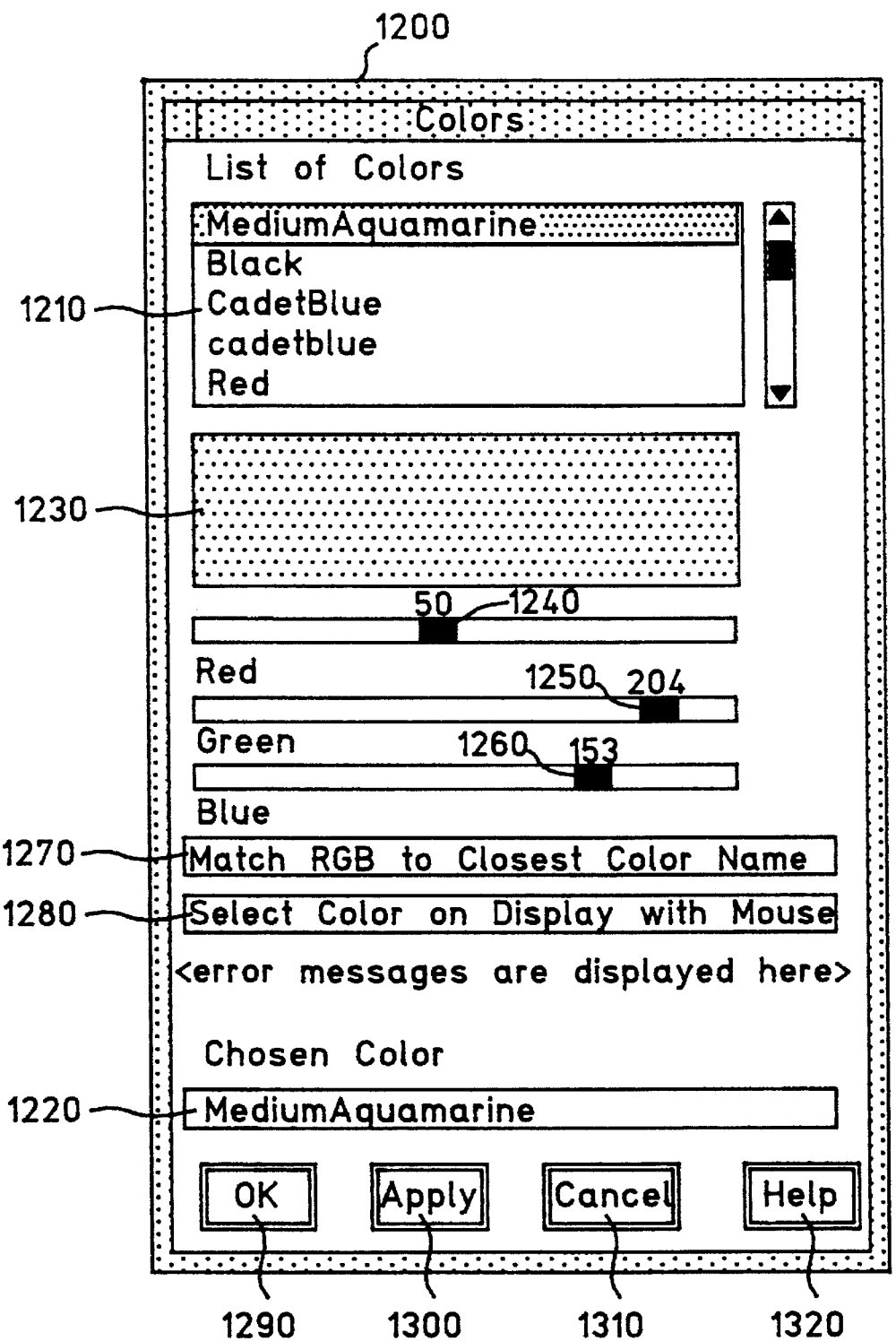
FIG. 10 is an illustration of a graphical resource editor color browser.

Referring now to FIG. 10, a color browser editor 1200 is shown. The color browser editor includes a scrollable color "List" window 1210 containing a list of color names. These names are retrieved from an X Window System file known as rgb.txt. This file is maintained in a standard X Window directory. It contains a list of color names and corresponding red, green and blue color values. The list of colors in the scrollable "List" window 1210 represents a set of browsing editor value selection objects providing user activatable interfaces for setting color resource values. The scrollable window 1210 provides an input display field containing the color value selection objects. These objects can be selected using a mouse and the selected colors will be displayed in an output display field 1220 located near the bottom of the browsing editor window 1200. The output display field 1220 also provides a data entry field in which color values can be entered via keyboard input when the data field 1220 is selected to receive input using a mouse. Below the scrollable window 1210 is a color patch 1230 which also represents an output display field. The color displayed in this field corresponds to the user selected color. Below the color patch 1230 are three slider bars 1240, 1250 and 1260 corresponding to the colors red, green and blue, respectively. These sliders provide additional browsing editor value selection objects for incrementally adjusting resource color. When a slider is moved, the color patch above the sliders reflects the color defined by the RGB slider values. After the RGB sliders are positioned to a desired color, the user can press the "Match RGB to Closest Color Name" push button 1270. Activation of this button causes the editor to find the closest color name to the RGB value in the list of colors 1210 and to highlight that color in the list. The editor also repositions the RGB sliders accordingly, and the "Chosen Color" field 1220 is set to the appropriate color name. A second push button 1280 labelled "Select Color on Display with Mouse" allows the user to select any color that appears in the display by activating a mouse button. The color browser editor finds the RGB values for that color and repositions the slider bars to the appropriate values. The editor also highlights the color name in the list of colors 1220 and displays the name in the "Chosen Color" field if the color values match a valid color name. At the bottom of the color browser window 1200 are four push buttons 1290, 1300, 1310 and 1320. The button labelled "OK" and is used to accept the color appearing in the "Chosen Color" field 1220. This causes the selected color to be displayed in the appropriate resource value field of the custom interface window 300. The button labelled "Apply" causes the selected color to be applied to a concurrently running client application if on-the-fly customization has been requested. The button labelled "Cancel" causes the color browser to be exited without saving any color values. The button labelled "Help" calls a help facility for the color browser.

Figure 11:
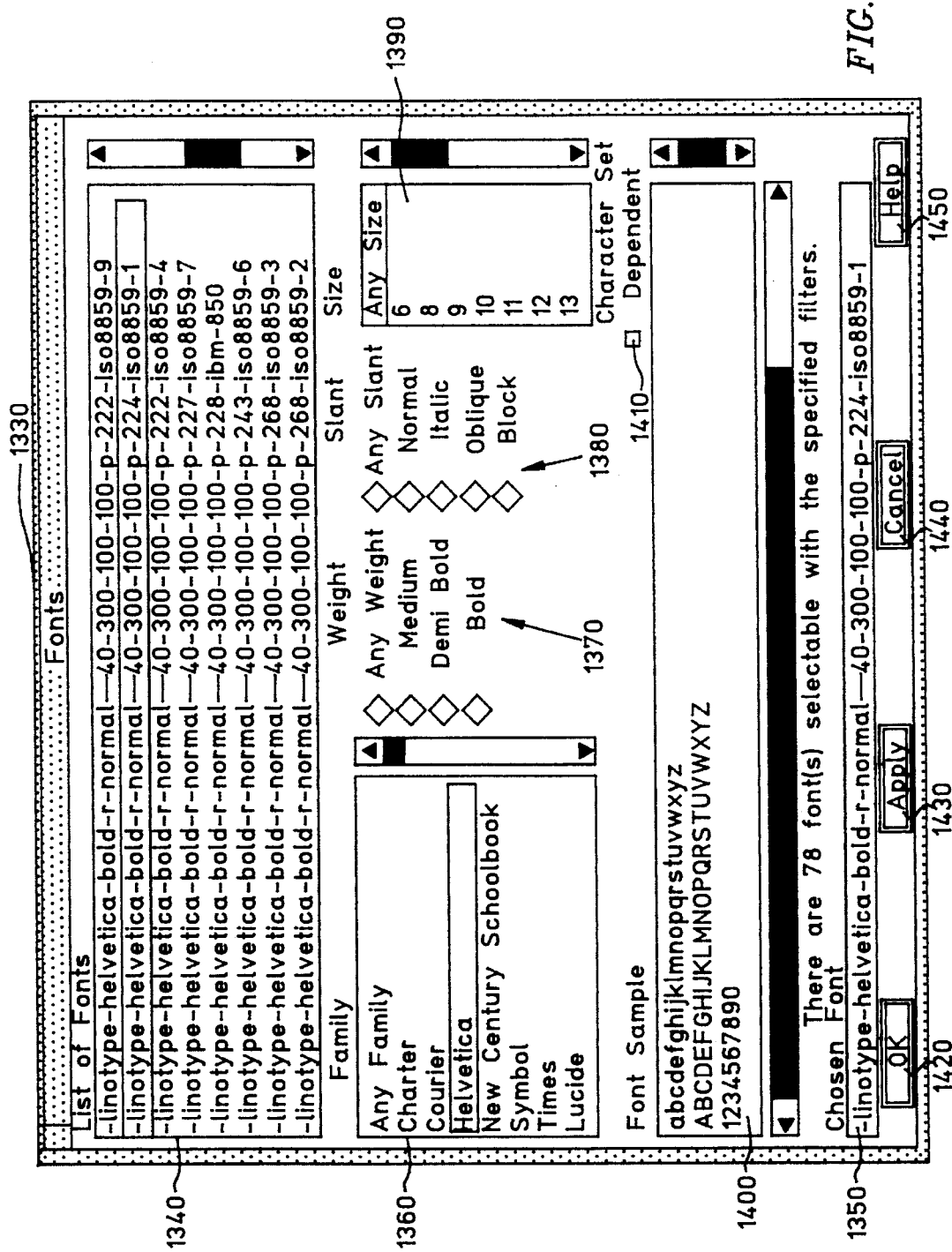
FIG. 11 is an illustration of a graphical resource editor fonts browser.

Turning now to FIG. 11, a fonts browser editor is implemented through a pop-up fonts browser window 1330. The fonts browser window 1330 includes a scrollable "List" window 1340. This window represents an input display field containing a set of browsing editor value selection objects providing user activatable interfaces for setting font resource values. The list of fonts contains fonts defined in X Window System files. These fonts can be selected by activating a mouse button. The selected font will appear in the "Chosen Font" display field 1350. The display field 1350 represents an output display field but may also be used as an input field. This is done by selecting the field using a mouse to focus the keyboard input and entering relevant font information using the keyboard. Below the scrollable font list window 1340 are four filter objects providing a user activatable interface for limiting the number of font types available for user selection. The first filter object is a scrollable list 1360 of font family values. Desired families may be selected from this list using a mouse. A second filter object is provided by a list of radio dials 1370 corresponding to selectable font weight values. A third filter .object is provided by a list of radio dials 1380 corresponding to selectable font slant values. A fourth filter object is provided by a scrollable window 1390 containing a list of selectable font sizes. Below the filter objects is a scrollable "Font Sample" window 1400 representing an output display field that shows selected font samples. There is also provided a push button 1410 representing a character set object that provides a user activatable interface for controlling other browsing editor values selection objects to selectively display language dependent and language independent descriptions of editable font resources. At the bottom of the font browsing editing window 1330 are four push button 1420, 1430, 1440 and 1450. These push buttons provide functions that correspond to to those of the buttons 1290–1320 in the color browser editor window 1200.

Figure 12:
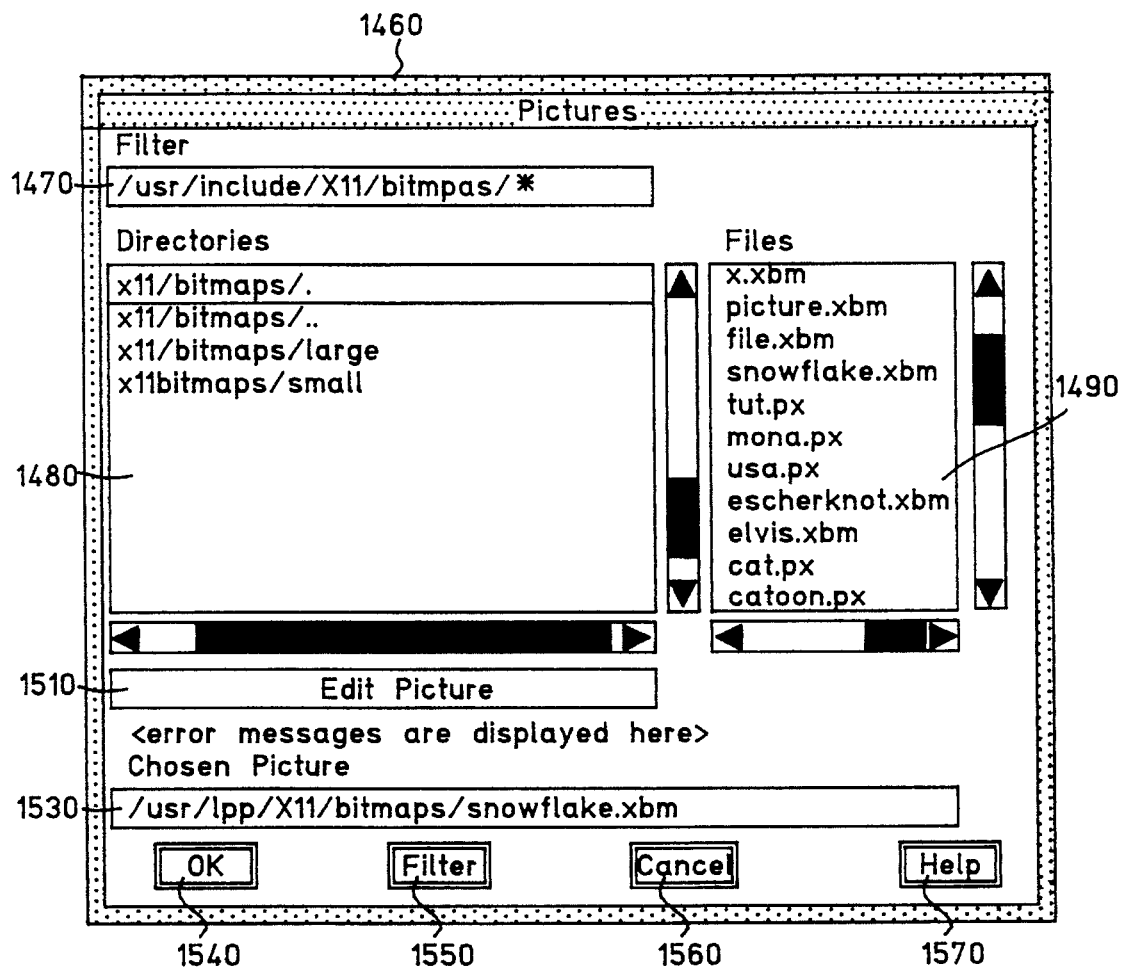
FIG. 12 is an illustration of a graphical resource editor pictures browser.
Figure 13:
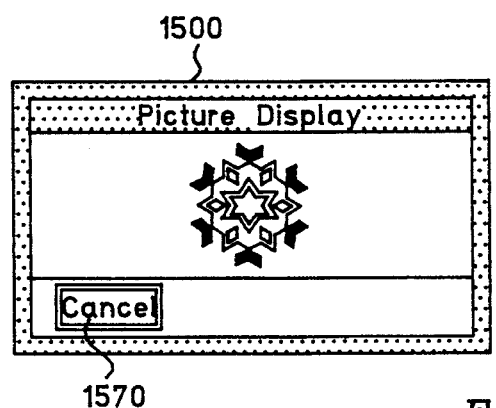
FIG. 13 is an illustration of a dialogue box selected through the pictures browser of FIG. 12.

Referring now to FIG. 12, a pictures browser editor is implemented in a pictures browser window 1460. The pictures browser window includes a "Filter" window 1470 for displaying a selected search string defining directory containing bitmap or pixmap files of interest. The value shown in the "Filter" window 1470 can be typed directly in the window or selected through a scrollable "Directories" window 1480. Adjacent to this window is a scrollable "Files" window 1490 containing a list of bitmap and pixmap files representing browsing editor value selection objects which may be selected using a mouse. When a selection is made, a pop-up window 1500 is generated as shown in FIG. 13. The pop-up window 1500 contains a picture display of the contents of the selected bitmap or pixmap file. This picture display can be edited by selecting the "Edit Picture" push button 1510 in the pictures browser window 1460. This activates an editor which is a separate application provided in the X Window System. This editor is called on behalf of the user by the resource editor. A "Cancel" push button 1520 is used to terminate the picture editor. The pictures browser window 1460 also includes a "Chosen Picture" output display field 1530 for displaying the directory and filename of a selected bitmap or pixmap. By mouse activation, this output display field can be used an input display field having keyboard focus for typing in a desired bitmap or pixmap directory and filename. Below the display field 1550 are four push buttons 1540, 1550, 1560 and 1570. These push buttons represent functions corresponding to those of the push buttons 1080–1110 in the "Save As . . ." window 1000.

Figure 14:
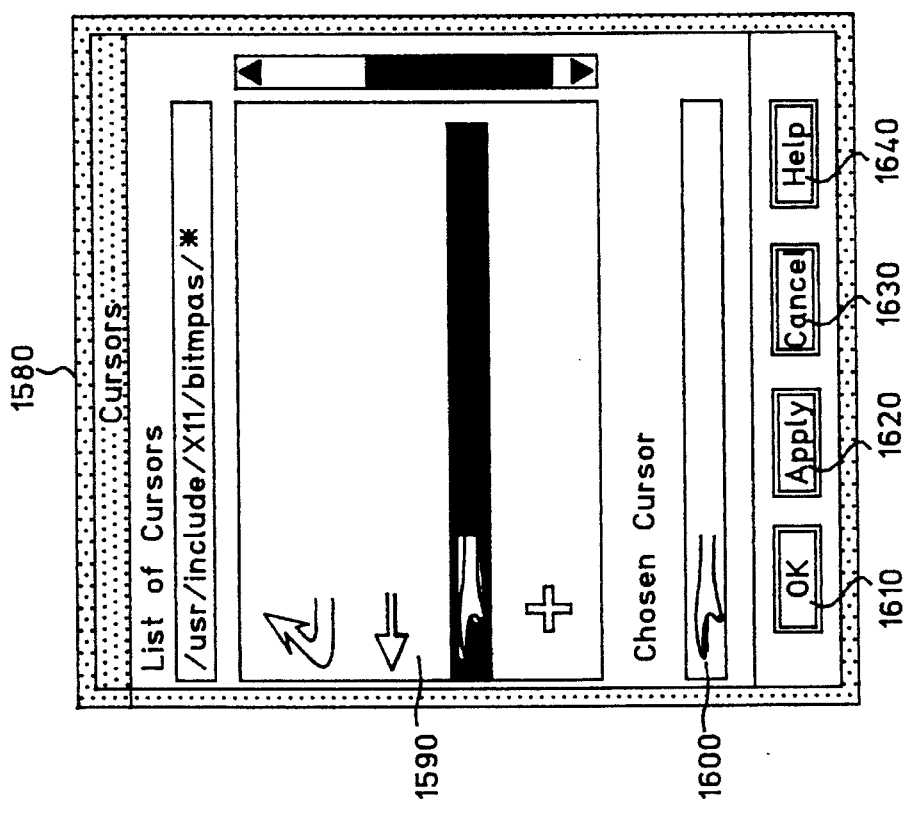
FIG. 14 is an illustration of a graphical resource editor cursors browser.

Turning now to FIG. 14, a cursor browser editor provided in a cursor editor window 1580. The editor window 1580 includes a scrollable "List" window 1590. This window represents a display field containing a set of graphical interface objects providing a user activatable interface for selecting a cursor. Below the scrollable window panel 1590 is an output display field 1600 labelled "Chosen Cursor" for displaying an image of a selected cursor. Below the "Chosen Cursor" field are four push buttons 1610, 1620, 1630 and 1640. These buttons provide functions corresponding to the functions of push buttons 1290–1320 in the color editor window 1200.

Figure 15:
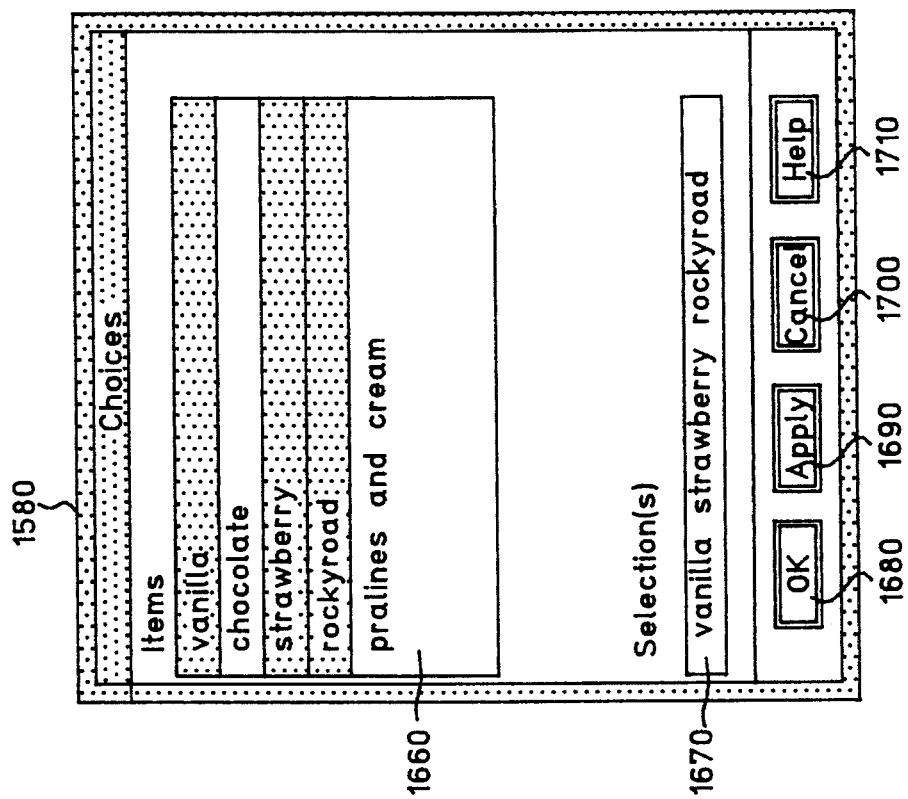
FIG. 15 is an illustration of a graphical resource editor choices browser.

Referring now to FIG. 15, a choices browser editor is provided in a choices editor window 1650. Within the window 1650 is a display field 1660 labelled "Items" and containing a list of selectable values. These values represent a set of graphical interface objects providing a user activatable interface for selecting multiple items from the list. Below the input display field 1660 is an output display field 1670 labelled "Selection(s)". This field displays items that are selected from the list in the input field 1660. In addition, by activating a mouse on the field 1670, the keyboard input focus can be placed in this field, allowing users to type selections therein. In that case, the output display field 1670 also serves as an input display field. Below the "Selection(s)" field 1670 are four push buttons 1680, 1690, 1700 and 1710. These buttons perform functions that correspond to the functions of push buttons 1290–1320 in the color editor window 1200.

Figure 16:
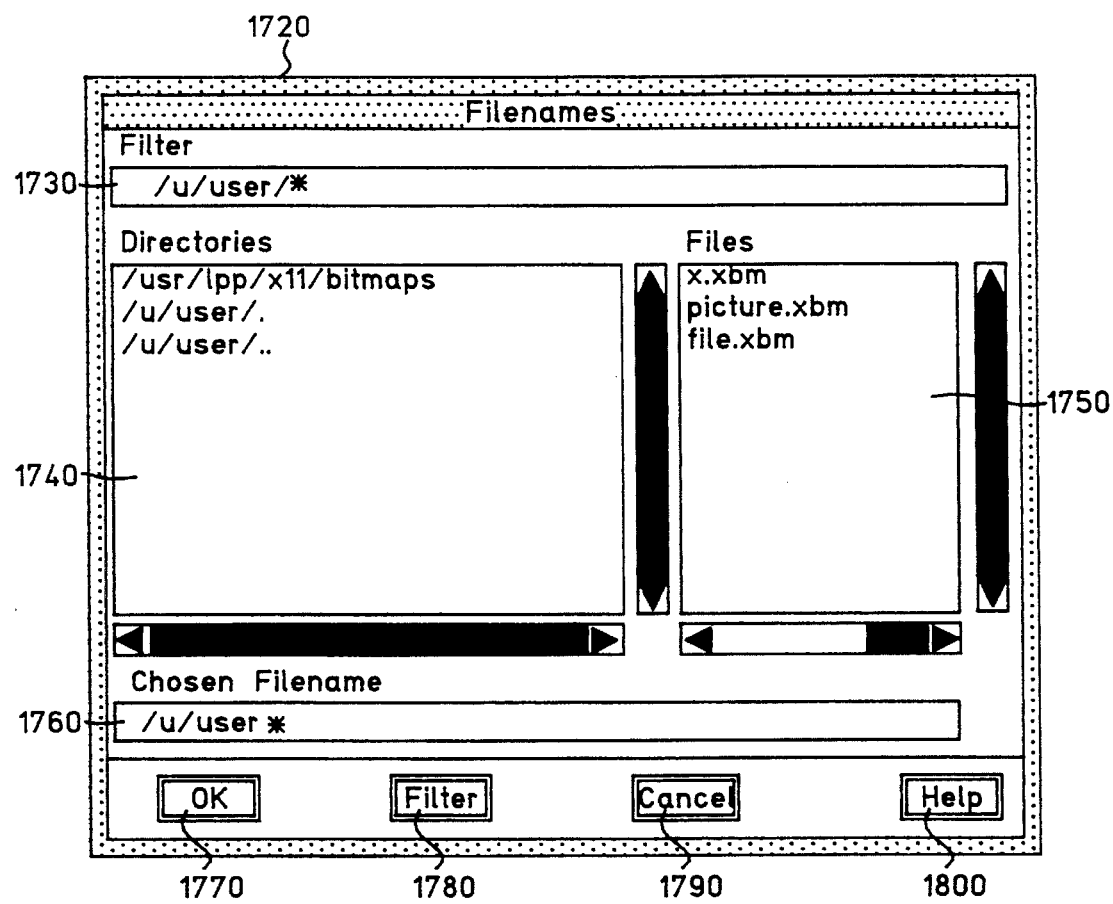
FIG. 16 is an illustration of a graphical resource editor filenames browser.

Referring now to FIG. 16, a filename browsers editor is provided in a filename editor window 1720. This editor window includes a "Filter" window 1730 for displaying selected search strings to be used as a filter for locating files. Below the "Filter" field 1730 is a scrollable "Directories" window 1740. This window contains a list of selectable directories to be used as a filter for locating selectable files. These files are listed in a scrollable "Files" window 1750. This window represents an input display field containing a set of selectable file objects providing a user activatable interface for selecting files. Below the windows 1740 and 1750 is a "Chosen Filename" window 1760 providing an output display field for displaying selected filenames. This field can also serve as an input field by activating a mouse therein. The mouse action changes the keyboard input focus to the field and allows the filenames to be typed therein. Below the field 1760 are four push buttons 1770, 1780, 1790 and 1800. These buttons provide functions corresponding to the functions provided by push buttons 1540–1570 in the pictures editors window 1460.

Figure 17:
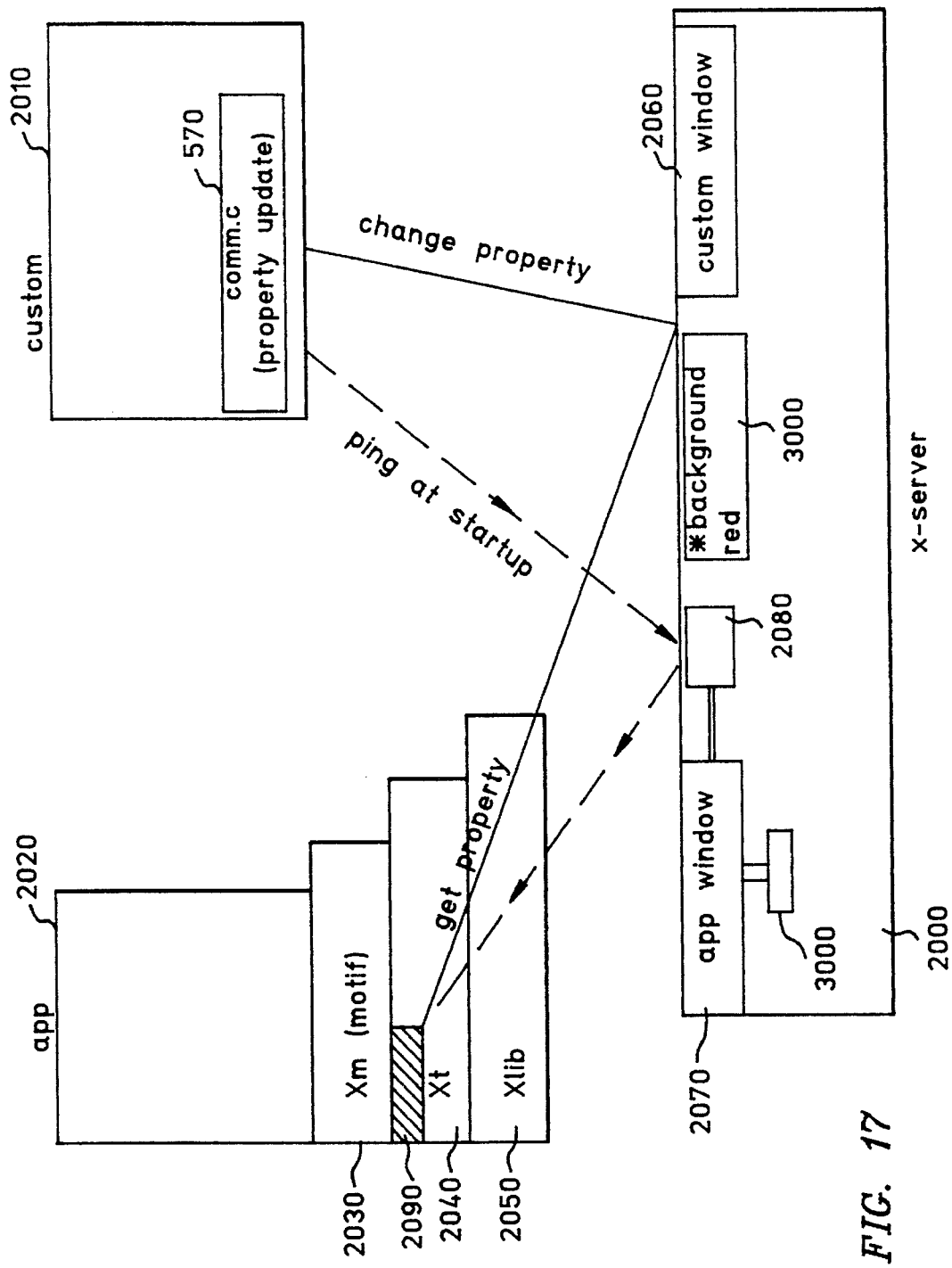
FIG. 17 is a block diagram illustrating communications invoked during "on-the fly" application customization.

Turning now to FIG. 17, a mechanism for implementing on-the-fly customization of client applications will now be described. The on-the-fly mechanism works with any application built using the X toolkit. In FIG. 17, there is illustrated an X server 2000 operating in a data processing system. The data processing system includes a graphical display which the X server controls on behalf of X client applications. Two such client applications are the custom application 2010, representing a graphical resource editor of the present invention, and a client application 2020 representing an application to be customized by the graphical resource editor. As is conventional in the X Window System, the application 2020 utilizes functions of an X toolkit 2030, the Xt intrinsics library 2040 and the Xlib 2050. The custom application 2010 is also built using these libraries. Within the custom application 2010 is the source file 570 containing a communications package for on-the-fly customization updates. As each client application is invoked, the X server assigns the application a top level window. In FIG. 17, the top level window 2060 is assigned to the custom application 2010. The X server assigns the top level window 2070 to the client application 2020.

When a user starts the resource editor, the graphical resource editor implements a procedure to establish on-the-fly communication with the client application. The communication procedure is also invoked when the user activates the "Reaquire Instant Changes" command option in the "Options" pull-down menu. In a first step of the communication process, the custom application 2010 obtains the window id of the top level application window 2070. In this step, the Xlib functions XGetClassHint() and XQueryTree() are invoked. The XQueryTree() function determines the window hierarchy and this hierarchy is descended recursively to a specified window depth. At each window level, XGetClassHint() is used to compare application names determined from windows with the application name entered during invocation of the resource editor. Windows matching the name or class identifier of the user-specified client application are returned in a linked window list. If multiple instances of the client application are running, the window matching procedure will identify them. Once the window id of the client application's top level window 2070 is determined, the custom application invokes a "ping" procedure to establish communication with the client application. In the "ping" procedure, the custom application 2010 sets a "property" on the client application's top level window 2070. In the X Window System, properties are arbitrary collections of data that provide a general mechanism by which applications share information with one another. Applications communicate by "hanging" properties on windows, as if the properties were tags. These properties are named and typed using "atoms", which are unique identifiers that represent character strings. Persons skilled in the art of programming under the X Window System will appreciate that an application can create any property for any window, and/or can store data into any property for any window. Moreover, an application can retrieve the data in any property for any window, even if that data was stored by some other application. Lastly, an application can solicit Property Notify events to determine when other applications alter any of the properties of a given window. The custom application 2010 uses the Xlib function XChangeProperty() to create a property 2080 labelled "Custom-init". This property is "hung" from the client application's top level window 2070. The "Custom-init" property is used solely to establish communication and thus contains no data. Once the "Custom-init" property is created, the custom application 2010 sets an event handler using the Xlib function XSelectInput(). The custom event handler notifies the custom application of changes in the "Custom-init" property 2080 by setting an event mask to trap X server event reports relating to property changes.

The mechanism for advising the client application 2020 that the "Custom-init" property 2080 has been generated is provided by an client event handler 2090 in the client's Xt intrinsics library. The event handler must be registered for the top window 2070 of the client application. This is preferably done in the XtCreatePopupShell() and XtAppCreateShell() functions in Xt's Create.c source file. The event handler 2090 is set using the XtAddEventHandler() function. This function sets an event mask for trapping property change events reported by the X server. The client event handler tests the Xevent union for event information relating to properties associated with the client application's top level window 2070. When the "Custom-init" property is created by the custom application 2010, the client event handler 2090 calls the Xlib XDeleteProperty() function to delete that property. The custom application 2010 is then notified that the property was deleted and, therefore, knows that communication has been established. This communication effort can be enhanced by a timeout procedure that is called using the XtAppAddTimeOut() function. If a client application window does not respond to a "ping" within a specified time, the timeout procedure deletes the application's window from the window list generated during the initial window searching procedure. The "Custom-init" property for that window is also deleted. The timeout procedure also deactivates the "Instant Changes" toggle.

Once interprocess communication between the applications 2010 and 2020 has been established, changes in resource values in the custom application 2010 are sent to the client application 2020 by generating and placing data in a "Custom-data" property 3000 that is tied to the client application's top level window 2070. The Xlib XChangeProperty() function accomplishes this action. The data placed in the "Custom-data" property is a string containing an X Window resource specification representing an edited resource. The string includes the resource and its edited value. It also includes the client application class name which is appended to the resource information in the custom list by the resource editor. If the resource value is NULL, the "Custom-data" property is not set.

When the client event handler 2090 identifies a "Custom-data" property event, it retrieves the resource specification and value from the "custom-data" property using the Xlib function XGetWindowProperty(). The next step is to search the widget tree of the custom application 2020 in order to match the resource string to the widgets for which it applies. The resource value must then be set to each matching widget. Starting with a widget corresponding to the resource specification, the procedure goes to the top of the widget tree by applying the Xt function XtParent() on successive client application widgets until a NULL value is returned. The procedure then proceeds down the tree to find all widgets corresponding to the resource specification. Widgets utilizing the resource are modified by updating the application resource database using the Xt function XtVaSetValues().

The determination of widgets to which to apply modified resource values must take into account the manner in which resources are specified by the X Window resource manager. As described above, resources are specified using strings which identify, by name or class, the widget or widgets in the widget hierarchy to which they apply. Two kinds of delimiters may be used to create the string. The first delimiter type is a dot '.'. The dot delimiter specifies a unique path through the application's widget tree. For example, to specify foreground color of a widget named "button1" located in a widget named "menu", in an application named "app", can be specified as follows follows:

| | |
|---|---|
| app.menu.button1.foreground: | red |

Because it is often inconvenient to specify resource values using every member of the widget path, the X Window resource manager allows resources to be specified using a wild card asterisk character '*' to represent any number of widgets along the widget path. For example, the "button1" widget of the previous example can be specified as follows:

| | |
|---|---|
| app*button1*foreground: | red |

This resource specification is broader than the specification of the previous example because the resource applies to all widgets of the name "button1" and not just those in the "menu" widget. The resource can be specified even more broadly using:

| | |
|---|---|
| app*foreground: | red |

In order to correctly apply edited resources to the client application 2020, the delimiters used in the resource specification must be considered. This is accomplished by selectively parsing the resource string into the following components:

```
resource = App*Form*button1.background
resource segment = App
resource last segment = background          last_token = .
remainder = *Form*button1
```

The first step in the parsing procedure is commenced following the identification of the top level client application widget. In this step, the "resource segment" represents the application class name that was prepended to the resource string by the resource editor is removed. The next step is to parse off the "resource last segment" string and the delimiter or "last_token" that preceded it, and return these elements, together with the remaining portion or "remainder" of resource string. A special case exists if the length of the remainder is zero and the token is a '*'. This case covers resources of only one level, such as *background. A resource of this type is handled by "setting" the resource value on all widgets below the top level widget in the widget hierarchy. As described in more detail below, "setting" a resource value means that the resource value is applied only to widgets for which the resource type is valid.

With the exception of the special case of resource strings having only one level, all resource strings are recursively parsed and an attempt is made to match the resource last segment to widgets along each path in the widget tree. When the entire resource string has been matched along one widget tree path, the resource value is set to a single matching widget or to the widget and its descendents, depending on whether the delimiter preceding the final resource segment is a '.' or a '*'. The delimiters thus determine the widgets to which the resource values will be set. The delimiters also determine the manner in which the widget tree is traversed when the comparison of a resource segment and a widget does not result in a match. In that case, the procedure takes one of two actions depending on delimiter type. If the delimiter is a '.', the procedure loops back in the tree to begin searching along other widget paths in the widget hierarchy. If the delimiter is a '*', the procedure descends the widget tree to the next level but does not parse the resource string. In cases where a match exists, and the end of the resource string has not been reached, the widget tree is descended to the next level and the resource string is parsed to free the next resource segment. This step is taken regardless of the delimiter used. As each search path is exhausted, either by finding a match or by finding no match at all, the procedure loops back to find a new path to search. The search continues until each search path has been exhausted.

The recursion procedure for parsing the resource string and descending the widget tree can be readily understood when considered in pseudocode form, as follows:

*/ _set_and_search recursive function */ loop looking at all the children of each widget
 if the resource segment and current widget name or class match if '.' is the resource separator
  if the end of the resource string has been reached if '*' is the last separator then set the value over this widget and all its descendents else if '.' then set the value over this widget only
 else
  descend the widget tree, parse off the resource segment, determine the children of this widget and call _set_and_search procedure for each child widget
 return
 (At this point, the_set_and_search recursive function returns so that this widget's siblings will be evaluated).
 if '*' is the resource separator
  if the end of the resource string has been reached if '*' is the last separator then set the value over this widget and all its descendents else if '.' then set the value over this widget only
 else
  descend the widget tree, parse off the resource segment, determine the children of this widget and call _set_and_search procedure for each child widget
 else
  if '.' is the resource separator continue looping—call_ set_and_search procedure to look at the rest of the siblings of this widget
  if '*' is the resource separator descend the widget tree but don't parse the resource string and continue looping call _set_and_search procedure to look at the rest of the siblings
end loop When a resource string and one or more widgets have been matched, the resource value must be set to the widgets. The procedure for setting resource values first determines if the resource type is valid for each widget. For example, labelString is a valid resource for a label widget but not for a bulletin board widget. In order to determine whether the resource can be set a particular widget, a list of all valid resources for the widget is obtained from the application's resource database. These resources are matched against the value portion of the user-edited resource string. If the user-edited resource is not a valid resource for the widget, or if the resource name or class are NULL, the next widget is tested. The next step in the procedure is to build from the user-edited resource a full resource name and class specification for the widget of interest which can be used to query the resource database.

In the query process, the resource and its value are placed in the application's resource database and then queried back out again using specific name and class resource strings that that were built from the widget information. This ensures that the resource editor's on-the-fly paradigm is followed: an application that is instantaneously updated should look the same as one that is restarted using the .Xdefaults file. The resource editor should not violate the precedence rules of the resource database manager. For example, consider the resource specifications:

| *background: | red |
|---|---|
| app*mywidget.background: | blue |

Both resource strings would apply to "mywidget". However, because the second string is more specific, it would override the first string so the resulting value would be blue. By calling the resource manager function XrmPutStringResource() with the resource and value, and then querying the resource database manager with XrmGetResource(), the resource database manager is requested to apply its precedence rules and return the proper value.

Once the proper resource value is determined, the Xt function XtVaSetValues() is called with the resource name and the value. By using the XtVaTypedArg argument in the XtVaSetValues() function, the resource value, which is a character string type is automatically converted to a type known for the resource. Prior to this point, no manipulation is performed on the value string. The Xt intrinsics handle type conversion just as they would for string values read from the .Xdefaults file and it is therefore unnecessary to keep track of resource data types. Moreover, internationalization is not a concern; Xt and the X toolkit will automatically handle the resource value properly even if it is a multi-byte string.

Accordingly, a graphical resource editor for customizing software applications in a data processing system has been disclosed. Although preferred embodiments of the invention have been shown and described, it will be understood that many modifications thereof may occur to persons skilled in the relevant art. For example, it would be possible to provide editors or other graphical interface mechanisms for editing other resources types in addition to those described above. Such resource types could include keyboard editors, mouse editors, screen saver editors and many others. The invention therefore, is not to be limited except in accordance with the spirit of the appended claims and their equivalents.

We claim:

1. In combination with a data processing system the data processing system having a data processing unit, a video display terminal, a keyboard, a cursor control system including means for generating a screen cursor and a user actuatable cursor positioner for providing control inputs to the data processing system, a data storage device, and a graphical user interface system through which software applications running on the data processing system generate one or more graphical window objects on the video display terminal to provide user interaction functionality for the software applications, the appearance and behavior of the graphical window objects being partially determined by resources, a graphical resource editor for modifying selected resource values, comprising:

main window means for generating in the video display terminal a main interface window, said main window providing a graphical user interface object for interaction with the graphical resource editor;

resource category selection means for generating in said main window a resource category selection object including a list of selectable resource category objects containing resource category descriptors corresponding to categories of editable resources, said resource category selection object providing a user activatable interface for selecting from said list of resource category objects an editable resource category;

resource display means responsive to user activation of said resource category selection object for generating in said main window a list of resource descriptors corresponding to a selected category of editable resources;

resource value display means for generating in said main window a plurality of resource value display fields containing resource values representing the status of said resource descriptors corresponding to said selected category of editable resources; and resource value selection means for generating in said main window a set of resource value selection objects, said resource value selection objects providing user activatable interfaces for setting editable resource values.

2. A graphical resource editor for use in a data processing system, the data processing system having a data processing unit, a video display terminal, a keyboard, a cursor control system including means for generating a screen cursor and a user actuatable cursor positioner for providing control inputs to the data processing system, a data storage device, and a graphical user interface system through which software applications running on the data processing system generate one or more graphical window objects on the video display terminal to provide user interaction functionality for the software applications, the appearance and behavior of the graphical window objects being partially determined by resources, said graphical resource editor being configured for selectively customizing a plurality of said software applications by modifying selected application-specific resource values of the graphical window objects generated by said software applications, and comprising:

application selection means for generating in said video display terminal an application selection window providing means for selecting one of said software applications to be customized:

main window means for generating in the video display terminal a main interface window, said main window providing a graphical user interface object for interaction with the graphical resource editor;

resource category selection means for generating in said main window a resource category selection object including a list of selectable resource category objects containing resource category descriptors corresponding to categories of editable resources of an application selected for customization, said resource category selection object providing a user activatable interface for selecting from said list of resource category objects an editable resource category;

resource display means responsive to user activation of said resource category selection object for generating in said main window a list of resource descriptors corresponding to a selected category of editable resources;

resource value display means for generating in said main window a plurality of resource value display fields containing resource values representing the status of said resource descriptors corresponding to said selected category of editable resources; and resource value selection means for generating in said main window a set of resource value selection objects, said resource value selection objects providing user activatable interfaces for setting editable resource values.

3. The graphical resource editor of claim 2 further including means for generating an editable data file of character strings containing said resource category descriptors, and wherein said resource category selection means displays said resource category descriptors as labels in said resource category objects.

4. The graphical resource editor of claim 2 further including means for generating an editable data file of character strings containing said resource descriptors, and wherein said resource display means displays said resource descriptors as labels in said list of resource descriptors.

5. The graphical resource editor of claim 2 further including an editable data file of character strings corresponding to editable resources, each character string including a resource category descriptor and a corresponding resource descriptor, and wherein said resource display means identifies groups of resource descriptors of said data file corresponding to common resource category descriptors and generates said list of resource descriptors based on said identified groups.

6. The graphical resource editor of claim 5 further including means for generating from said data file character strings linked lists of resource descriptors corresponding to common resource category descriptors, and wherein said resource descriptor lists are generated from said linked lists.

7. The graphical resource editor of claim 2 wherein said resource value selection means includes browsing editor selection means for generating in said main window a set of browsing editor selection objects, said browsing editor selection objects providing user activatable interfaces for selecting resource browsing editors.

8. The graphical resource editor of claim 7 further including browsing editor means responsive to user activation of said browsing editor selection objects for generating browsing editor windows corresponding to resources identified in the main window.

9. The graphical resource editor of claim 8 further including browsing editor value selection means for generating in said browsing editor windows a set of browsing editor value selection objects, said browsing editor value selection objects providing user activatable interfaces setting resource values.

10. The graphical resource editor of claim 9 further including browsing editor selection display means responsive to user activation of said browsing editor value selection objects for generating in said browsing editor windows one or more output display fields containing a selected resource value.

11. The graphical resource editor of claim 10 wherein one of said output display fields is also a data entry field providing one of said browsing editor value selection objects.

12. The graphical resource editor of claim 8 further including selection save means for generating in said browsing editor windows a selection save object, said selection save object providing a user activatable interface for saving selected resource values.

13. The graphical resource editor of claim 8 further including selection application means tier generating in said browsing editor windows a selection application object, said selection application object providing a user activatable interface for applying selected resource values to an application.

14. The graphical resource editor of claim 8 further including resource value filter means for generating in said browsing editor windows a resource value filter object, said filter object providing a user activatable interface for limiting the number of resource values available for user selection.

15. The graphical resource editor of claim 2 further including means for generating an editable data file of character strings corresponding to editable resources, each character string including a resource descriptor and a corresponding resource type descriptor, and wherein said value selection means uses said resource type descriptors to generate value selection objects appropriate to corresponding ones of said resource type descriptors.

16. The graphical resource editor of claim 15 further including means for generating from said data file character strings linked lists of resource descriptors corresponding to common resource type descriptors, and wherein said value selection means generates said value selection objects using said linked lists.

17. The graphical resource editor of claim 2 further including resource editor save means for generating in said main window one or more resource editor save objects, said resource editor save objects providing a user activatable interface including objects for selectively terminating a resource editing session, saving resource editing results to a default resource file or discarding resource editing results.

18. The graphical resource editor of claim 2 further including resource editor view means for generating in said main window one or more resource editor view objects, said resource editor view objects providing a user activatable interface for selectively controlling said resource display means to display resources using said resource descriptors or using system resource strings.

19. The graphical resource editor of claim 18 wherein said resource editor view objects further provide a user activatable interface for controlling whether edited resource values are applied to applications running on the data processing system.

20. The graphical resource editor of claim 2 further including start-up window means for generating in the video display terminal a resource editor start-up window.

21. An application program resource editor for selectively customizing a plurality of software applications running in a data processing system, comprising:

means for generating an application selection window, said window providing means for selecting one of said software applications to be customized;

means for generating a custom resource panel for displaying a set of resources available to an application selected for customization and a set of editable attributes corresponding to each resource:

means for generating a set of resource editor panels, corresponding to some of said editable attributes, for graphically editing said resources;

means for generating a selection feedback field provided in each resource editor panel, for graphically displaying resource editing results;

means for generating a completion indicator field provided in each resource editor panel, for signalling completion of editing a resource; and means, responsive to signalling in said completion indicator field, for applying said resource editing results to said application.

\* \* \* \* \*

UNITED STATES PATENT AND TRADEMARK OFFICE
CERTIFICATE OF CORRECTION

PATENT NO. : 5,600,778
DATED : February 4, 1997
INVENTOR(S) : Swanson et al

It is certified that error appears in the above-indentified patent and that said Letters Patent is hereby corrected as shown below:

Title page field [56], add

First Column:

--5,115,501  5/1992  Kerr  395/600--

Between "5,041,992 ..." and "5,202,828...."

Second Column:

FOREIGN PATENT DOCUMENTS

0475581A2    European Pat. Of.
0518602A2    European Pat. Of.

Signed and Sealed this

Twenty-fourth Day of February, 1998

Attest:

BRUCE LEHMAN

*Attesting Officer*    *Commissioner of Patents and Trademarks*